Figure 1:
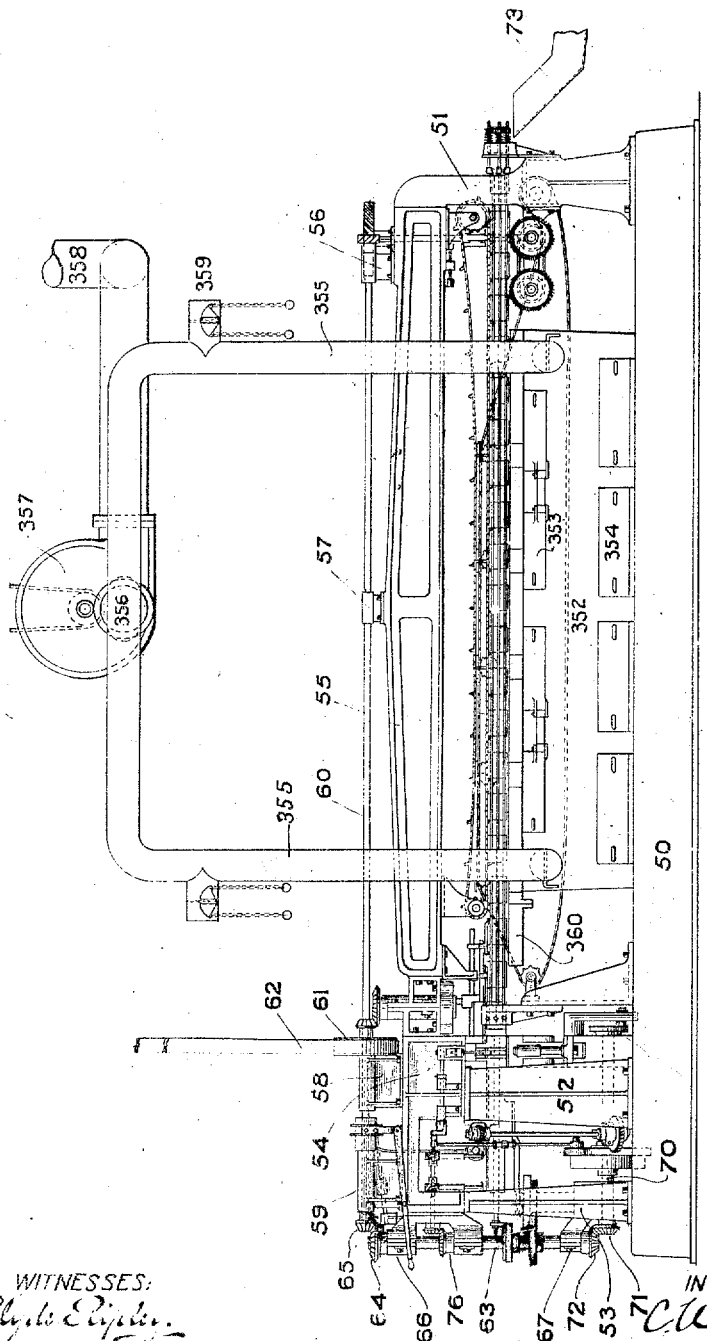

C. W. GRAHAM.
BODY FORMING MACHINE.
APPLICATION FILED FEB. 20, 1905.

970,620.

Patented Sept. 20, 1910.
22 SHEETS—SHEET 1.

WITNESSES:
INVENTOR
C. W. Graham
BY
ATTORNEYS.

C. W. GRAHAM.
BODY FORMING MACHINE.
APPLICATION FILED FEB. 20, 1905.

970,620.

Patented Sept. 20, 1910.
22 SHEETS—SHEET 4.

WITNESSES:
J. Clyde Ripley.
Robert S. Blair

INVENTOR
C. W. Graham
by
Warfield & Duell
ATTORNEYS.

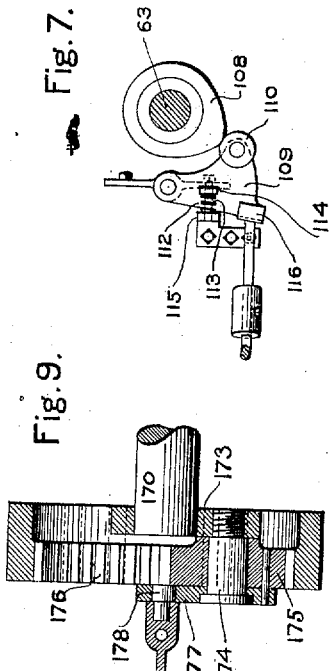
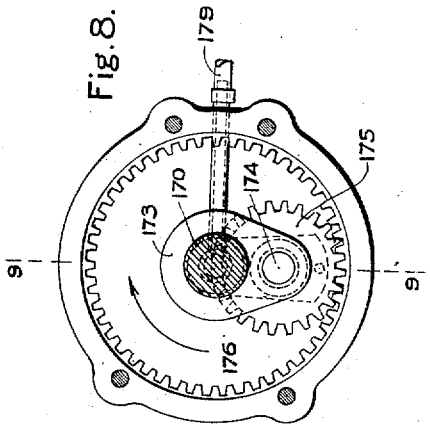
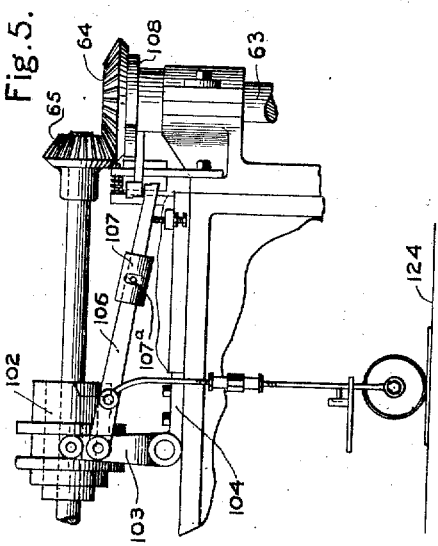

C. W. GRAHAM.
BODY FORMING MACHINE.
APPLICATION FILED FEB. 20, 1905.
970,620.
Patented Sept. 20, 1910.
22 SHEETS—SHEET 6.
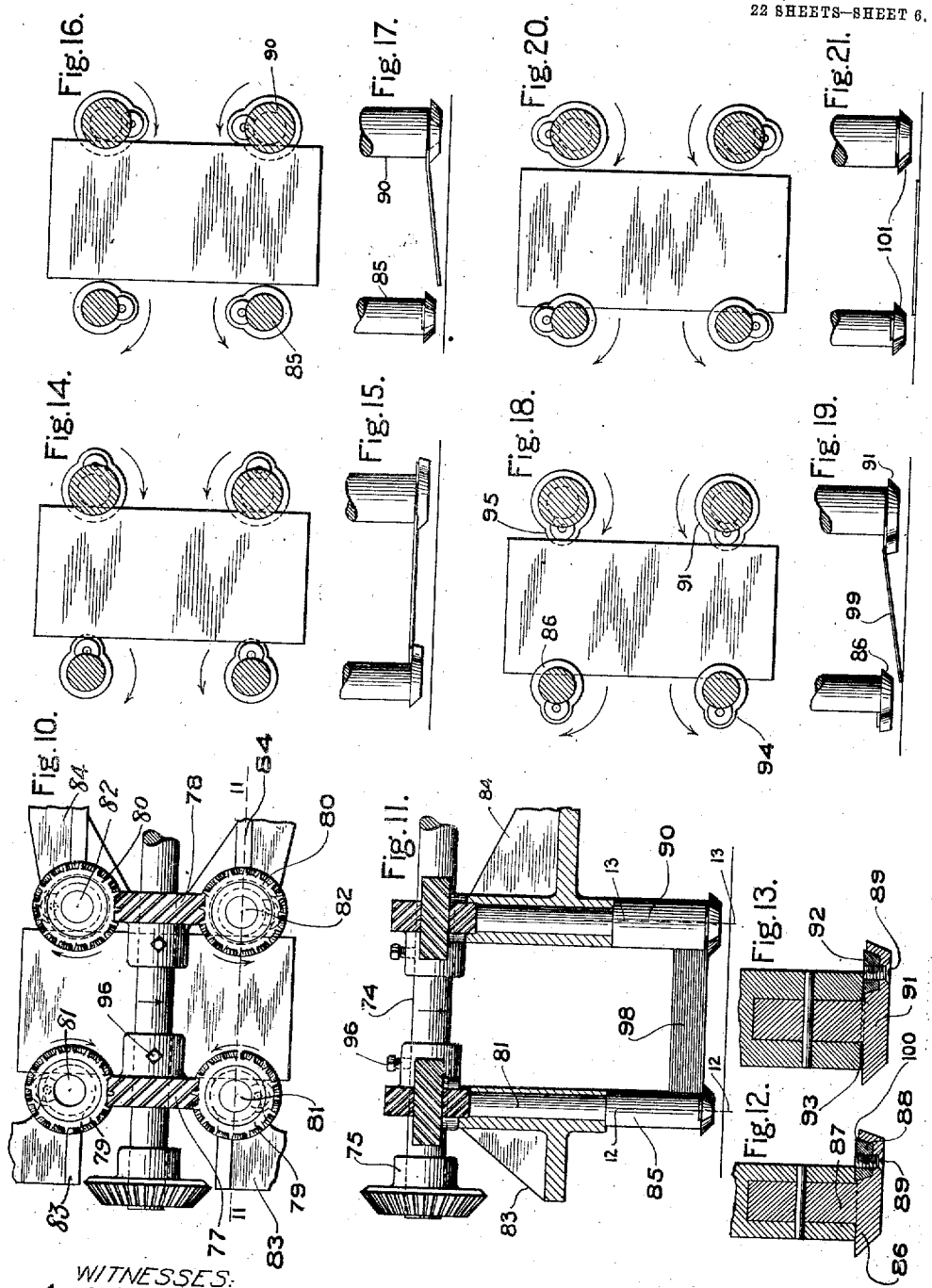

C. W. GRAHAM.
BODY FORMING MACHINE.
APPLICATION FILED FEB. 20, 1905.

970,620.

Patented Sept. 20, 1910.
22 SHEETS—SHEET 7.

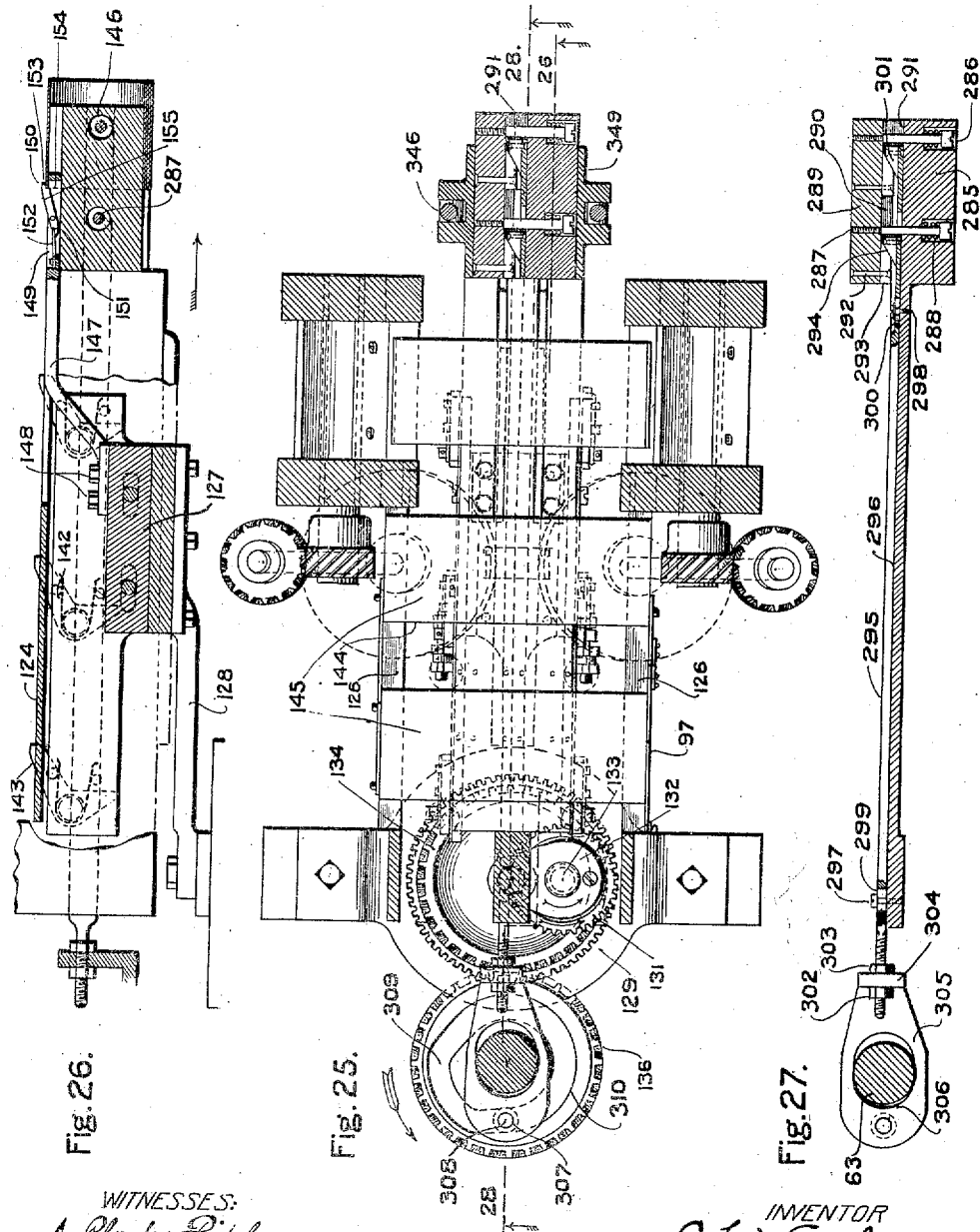

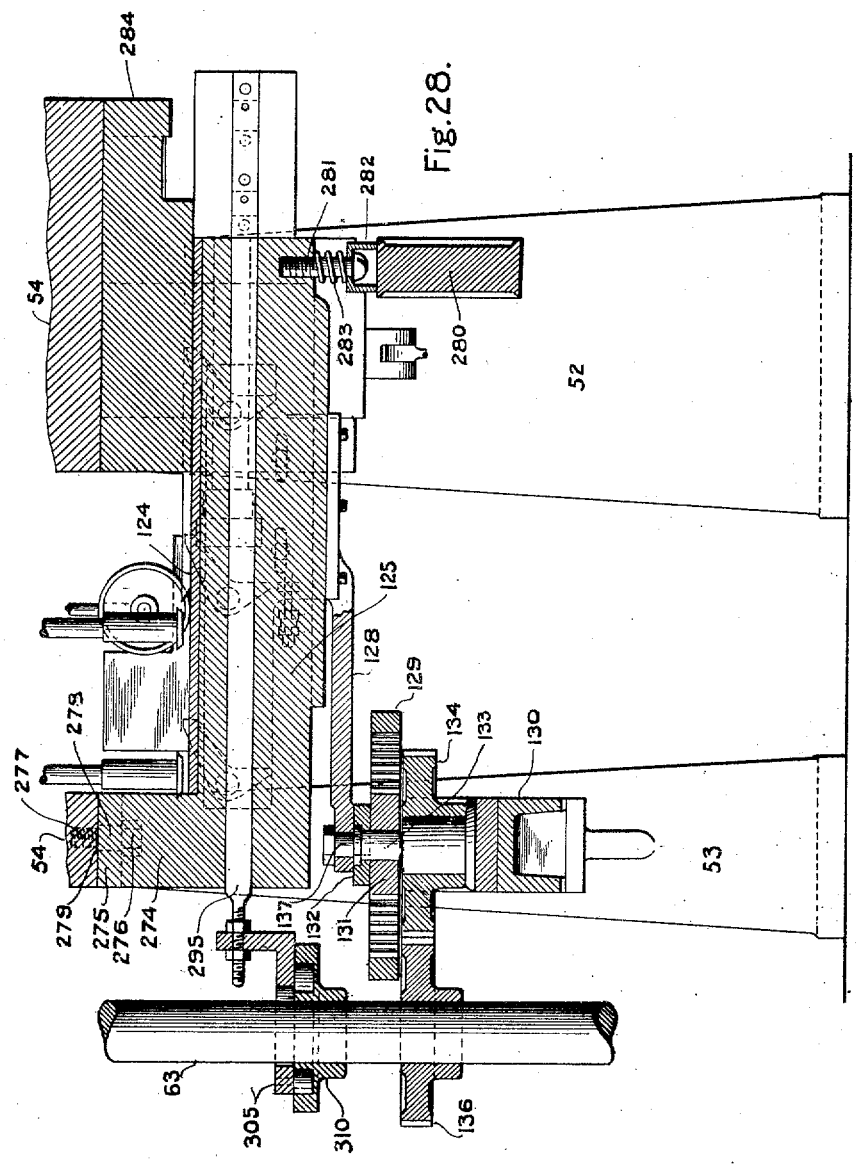

C. W. GRAHAM.
BODY FORMING MACHINE.
APPLICATION FILED FEB. 20, 1906.

970,620.

Patented Sept. 20, 1910.
22 SHEETS—SHEET 10.

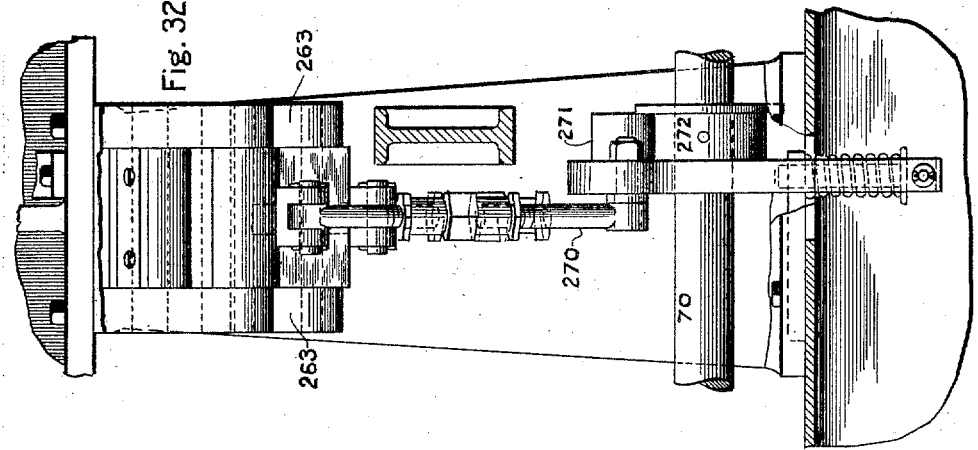
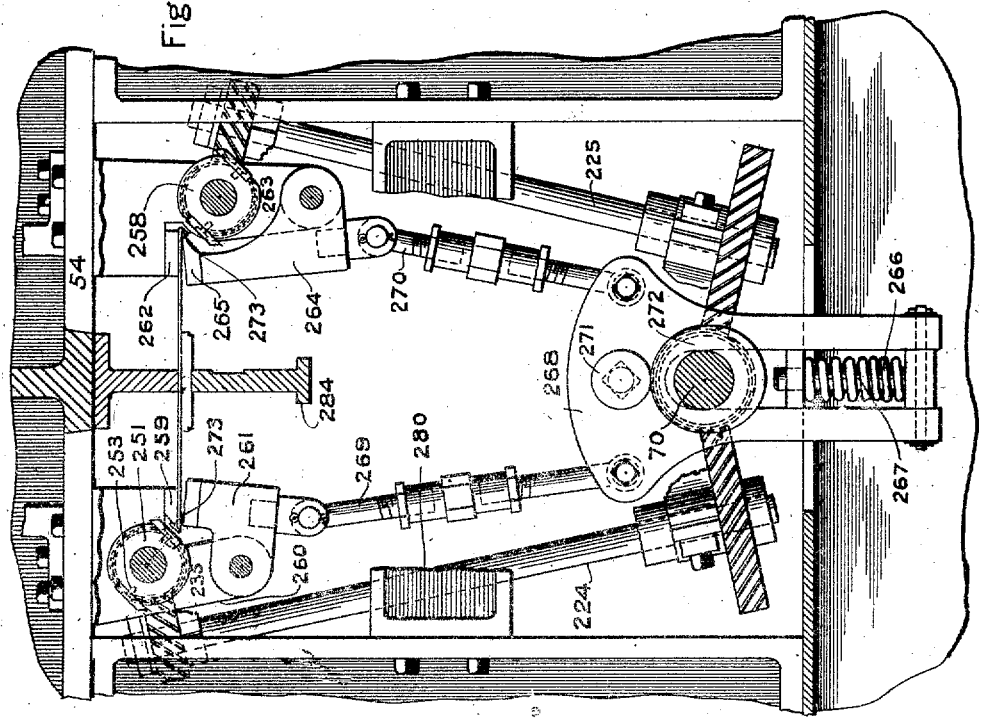

C. W. GRAHAM.
BODY FORMING MACHINE.
APPLICATION FILED FEB. 20, 1905.
970,620.
Patented Sept. 20, 1910.
22 SHEETS—SHEET 12.
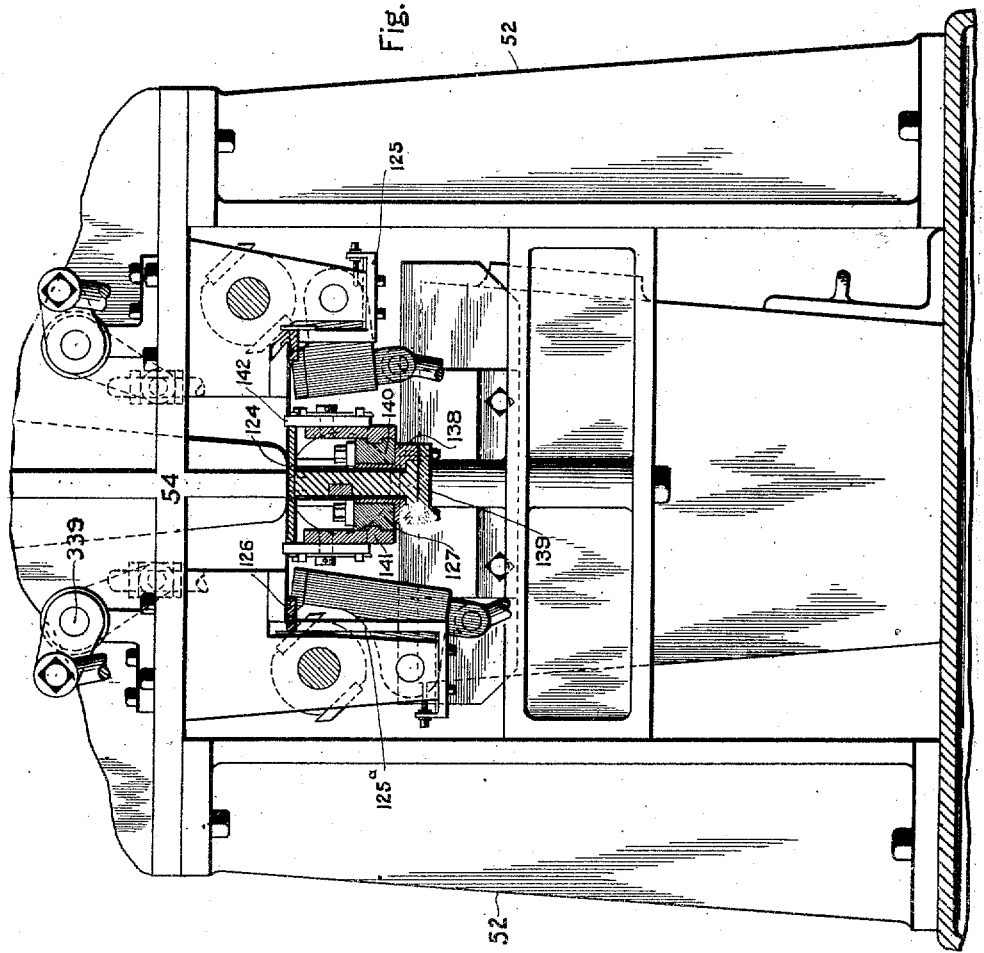

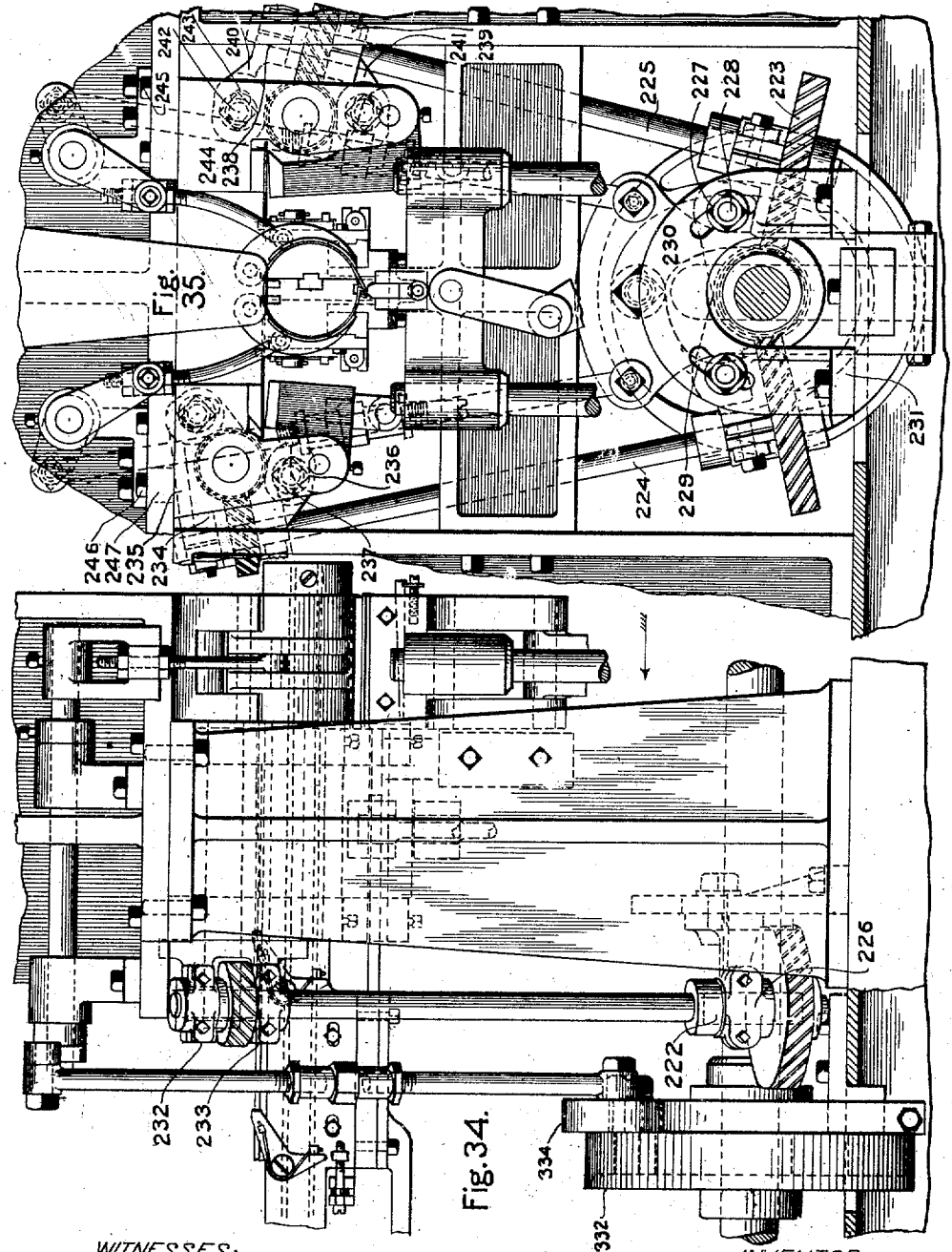

C. W. GRAHAM.
BODY FORMING MACHINE.
APPLICATION FILED FEB. 20, 1905.
970,620.
Patented Sept. 20, 1910.
22 SHEETS—SHEET 14.
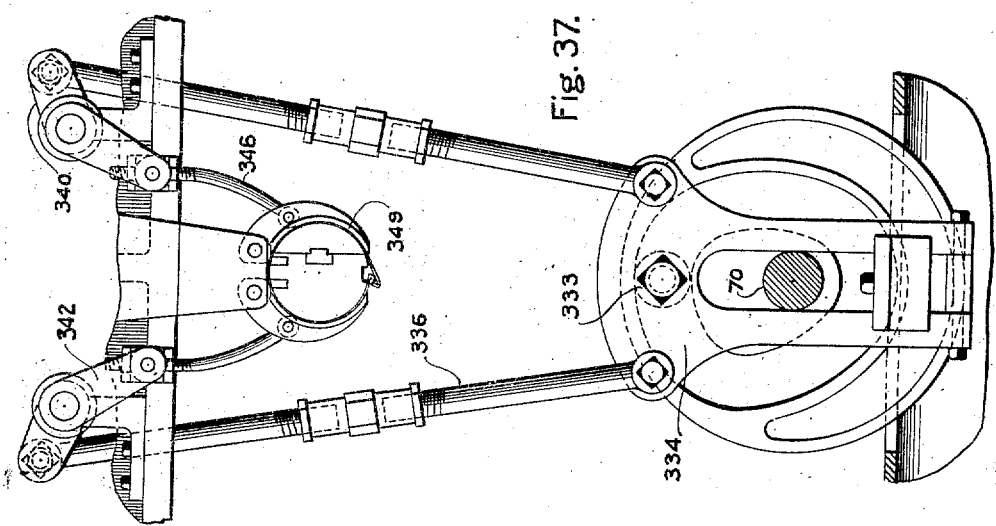
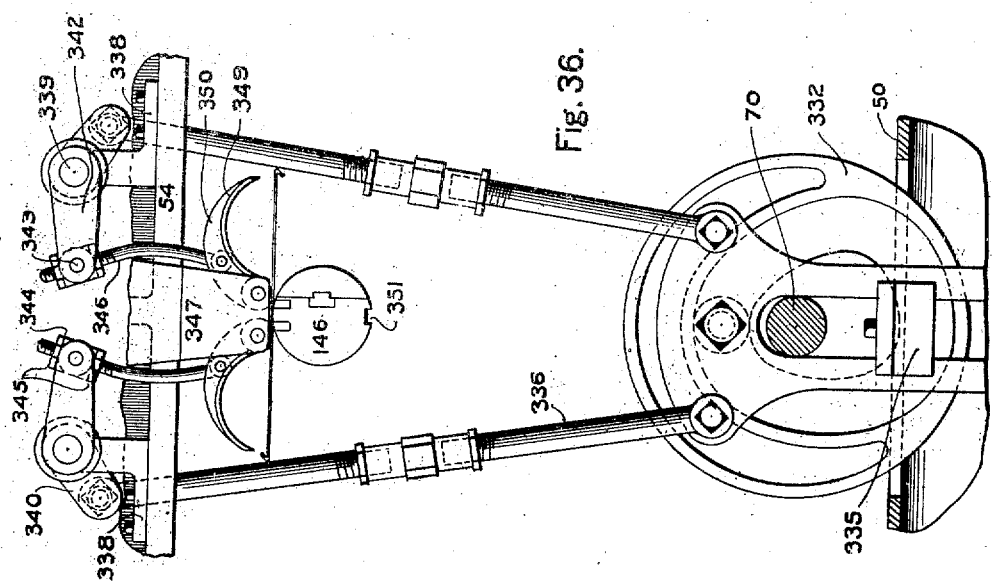

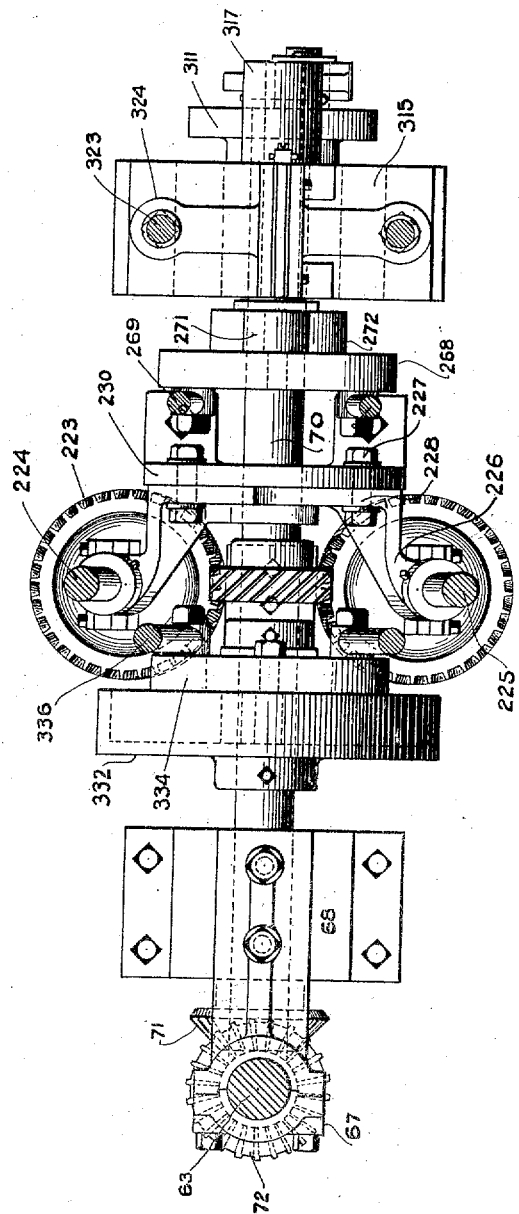

C. W. GRAHAM.
BODY FORMING MACHINE.
APPLICATION FILED FEB. 20, 1905.
970,620.
Patented Sept. 20, 1910.
22 SHEETS—SHEET 16.
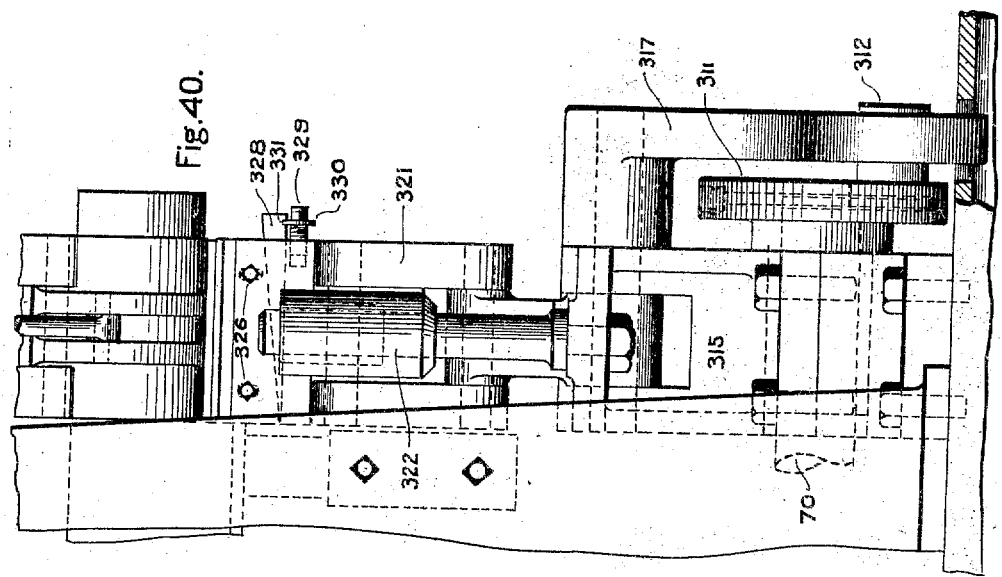
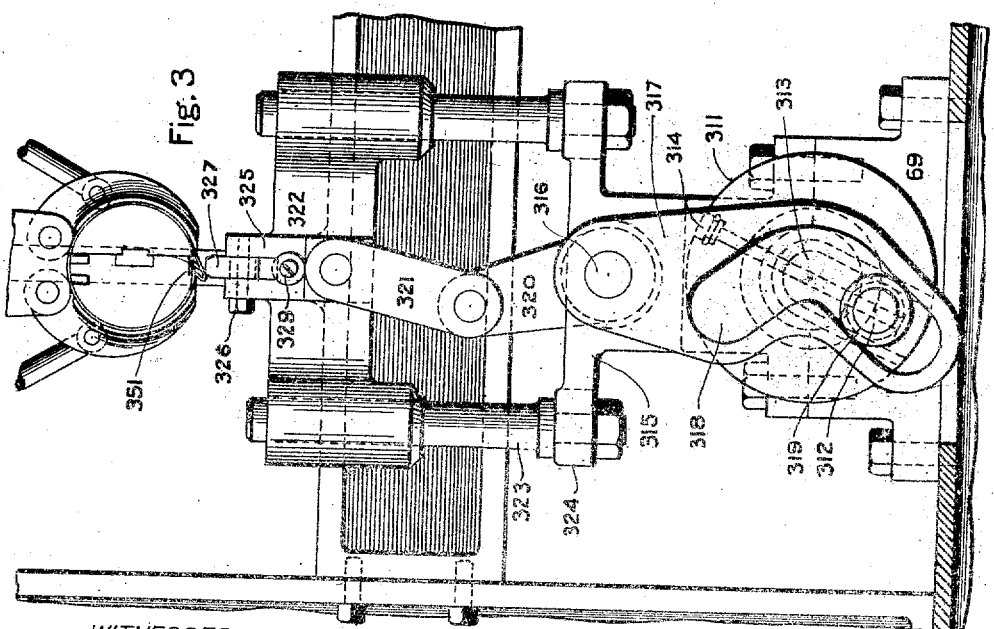

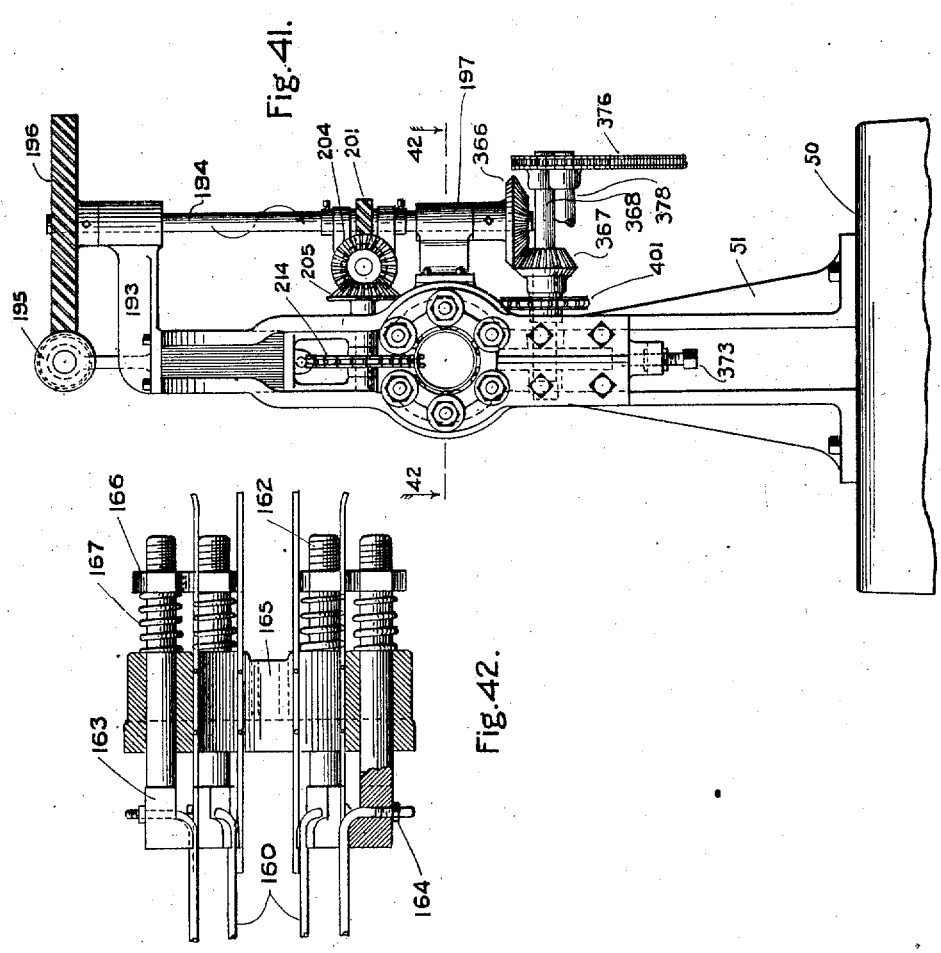

C. W. GRAHAM.
BODY FORMING MACHINE.
APPLICATION FILED FEB. 20, 1905.
970,620.
Patented Sept. 20, 1910.
22 SHEETS—SHEET 18.
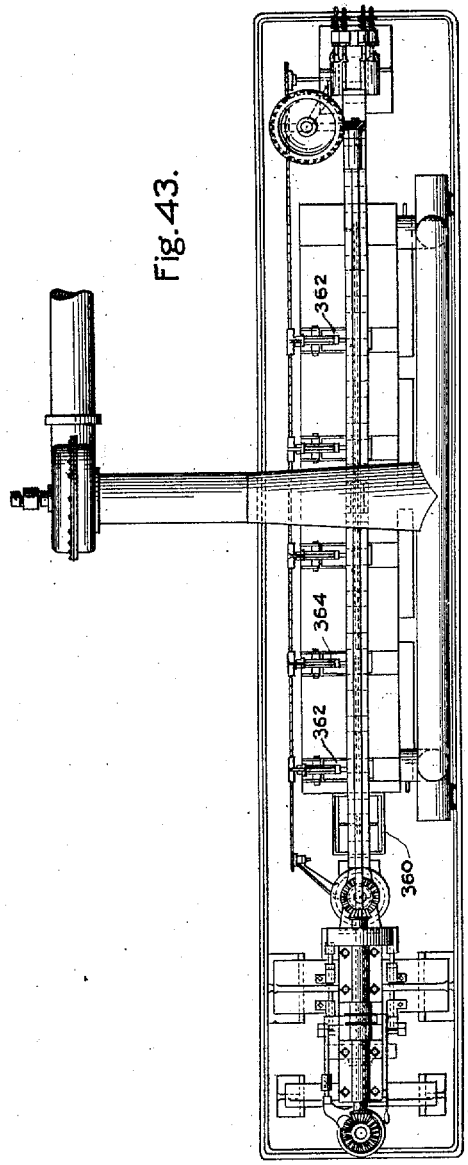
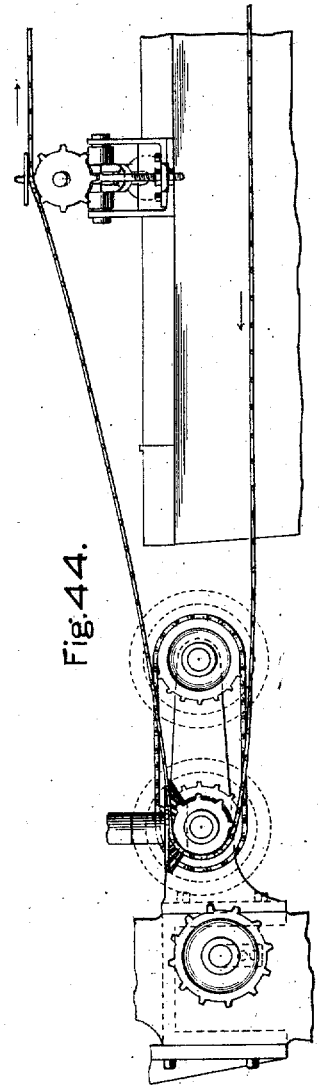
WITNESSES:
J. Clyde Ripley
Robert S. Blair
INVENTOR
C. W. Graham
BY
Warfield & Duell
ATTORNEYS.

C. W. GRAHAM.
BODY FORMING MACHINE.
APPLICATION FILED FEB. 20, 1905.
970,620.
Patented Sept. 20, 1910.
22 SHEETS—SHEET 19.
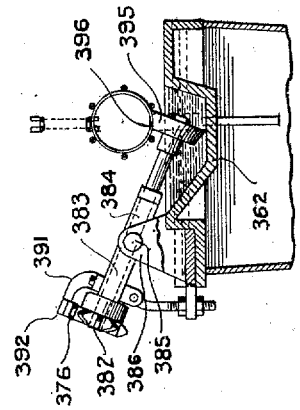
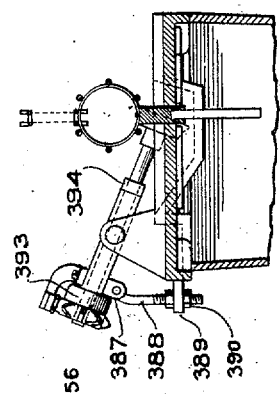
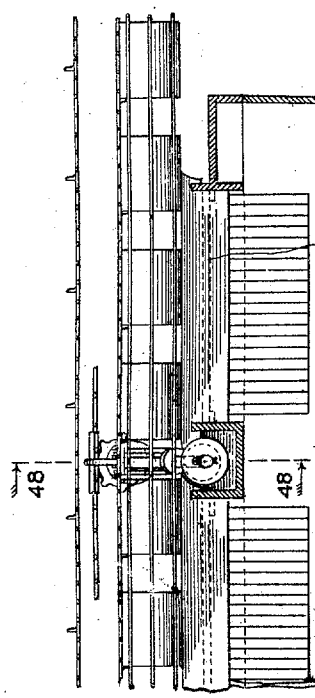
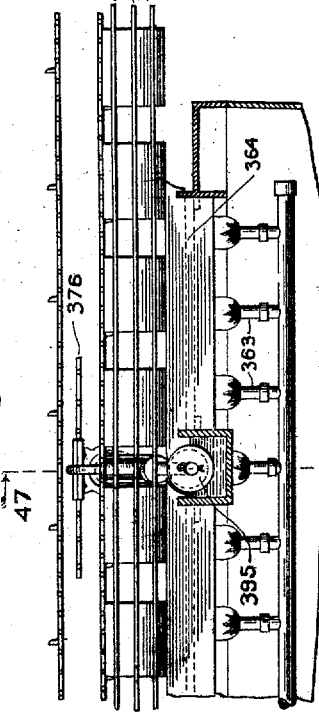
WITNESSES:
J. Clyde Ripley
Robert S. Blair
INVENTOR
C. W. Graham
BY
Warfield & Duell
ATTORNEYS

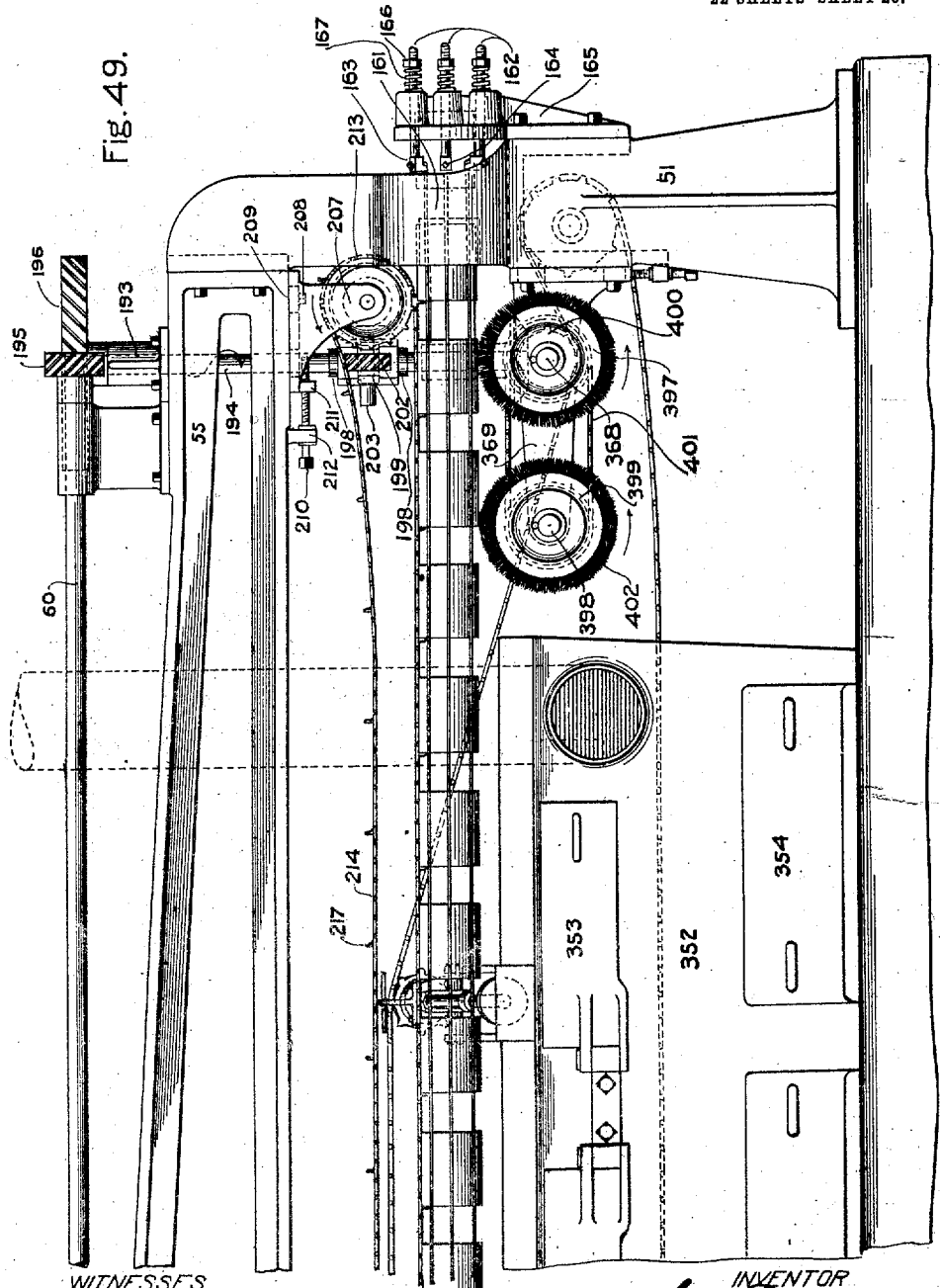

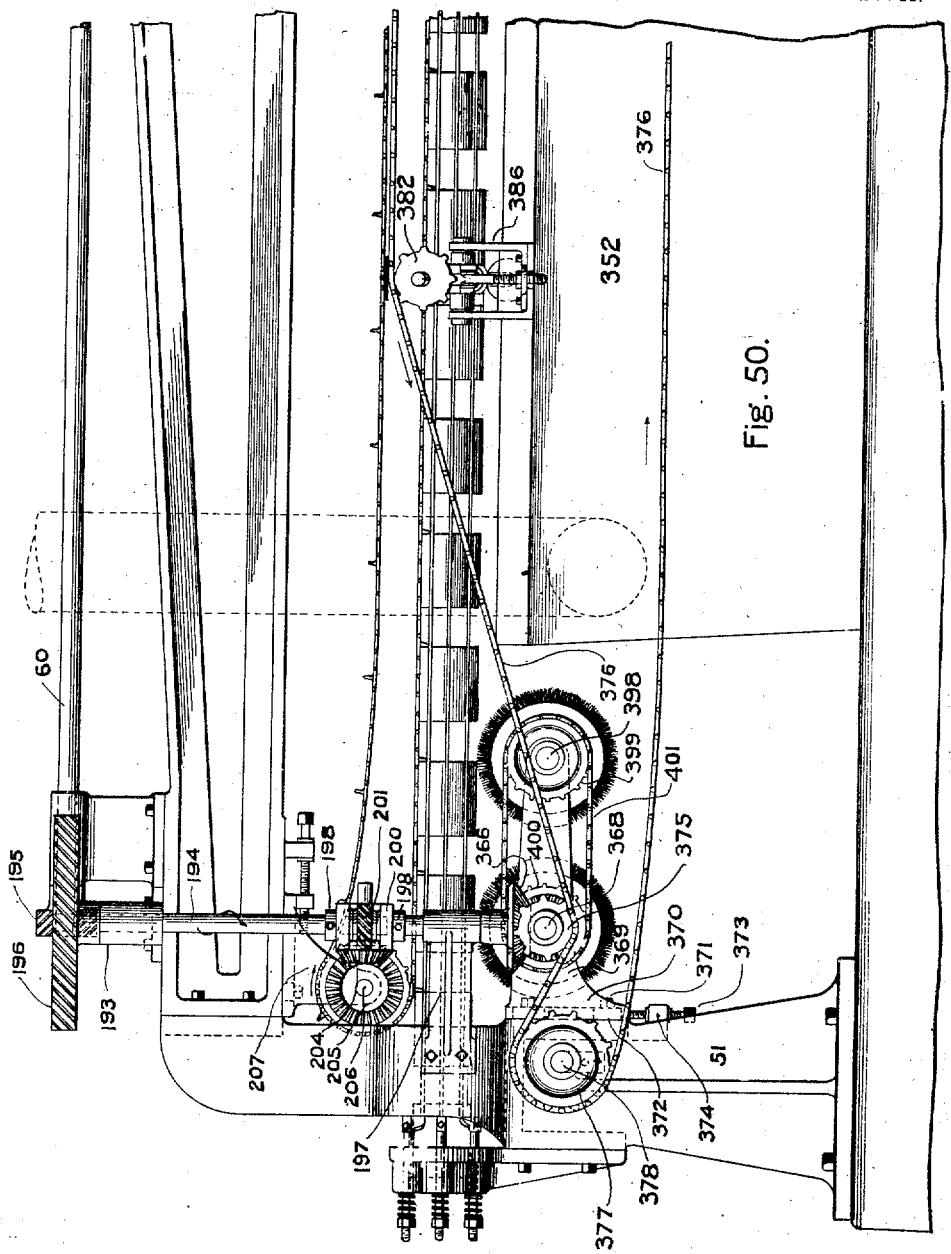

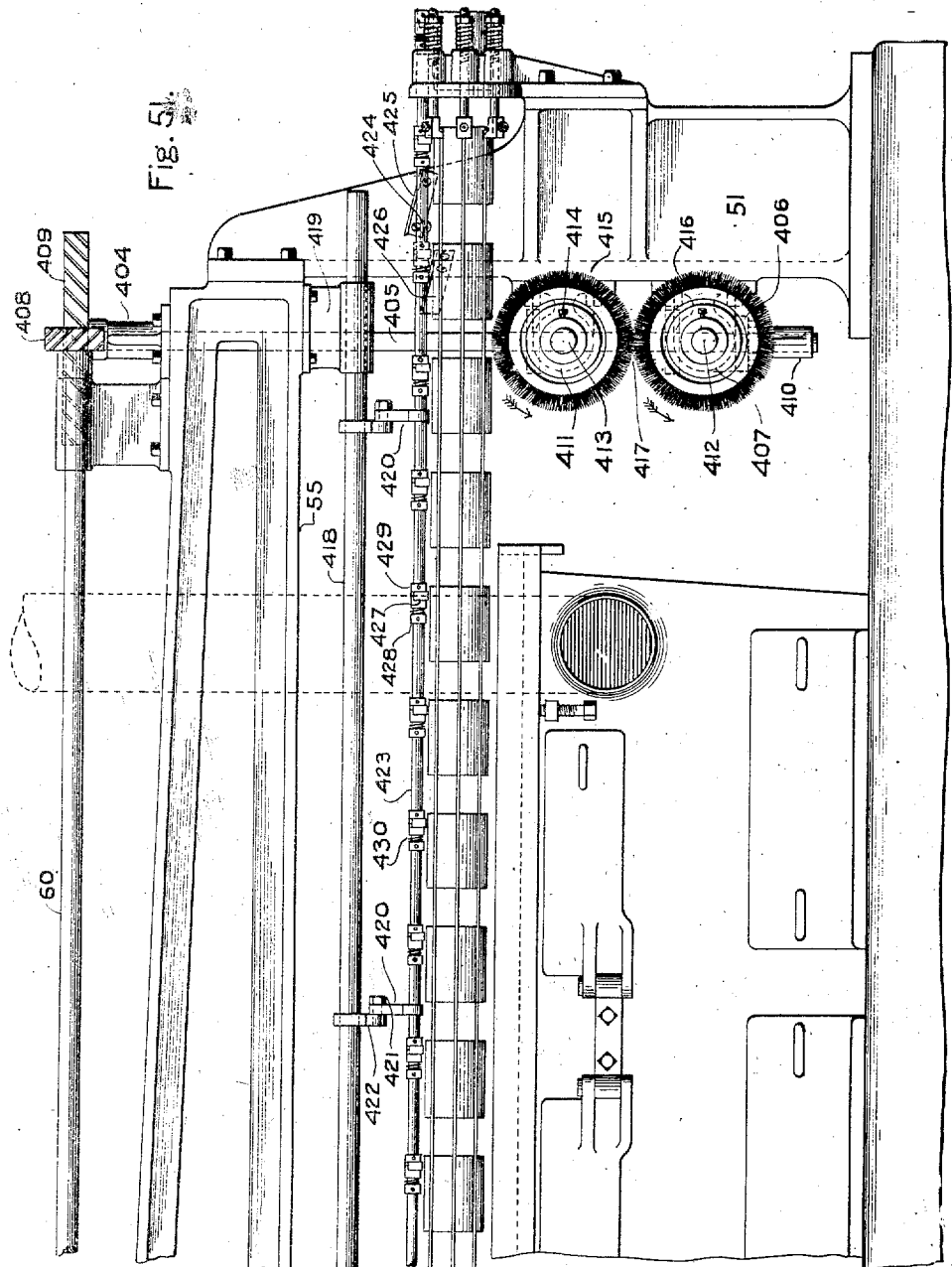

UNITED STATES PATENT OFFICE.

CHARLES W. GRAHAM, OF ROME, NEW YORK, ASSIGNOR, BY MESNE ASSIGNMENTS, TO AMERICAN CAN COMPANY, OF NEW YORK, N. Y., A CORPORATION OF NEW JERSEY.

BODY-FORMING MACHINE.

970,620.  Specification of Letters Patent.  Patented Sept. 20, 1910.

Application filed February 20, 1905. Serial No. 246,472.

*To all whom it may concern:*

Be it known that I, CHARLES W. GRAHAM, residing at Rome, in the county of Oneida and State of New York, have invented certain new and useful Improvements in Body-Forming Machines, of which the following is a full, clear, and exact description, such as will enable others skilled in the art to which it appertains to make and use the same.

This invention relates in, general, to means for handling and working sheet metal, and, in particular, to means for forming can bodies and the like.

One of the objects thereof is to provide a single machine which will automatically and efficiently form articles of the above general type from sheets of metal.

Other objects are to provide simple and efficient mechanisms adapted to carry out each step in the above formation.

Other objects are to provide durable and reliable means for carrying on each successive stage of the above formation and preparing the article for the next succeeding step.

Other objects will be in part obvious and in part pointed out hereinafter.

The invention accordingly consists in the features of construction, combinations of elements, arrangement of parts, and application of principles, which will be exemplified in the machine herein described, and the scope of the application of which will be indicated in the following claims.

Figure 2:
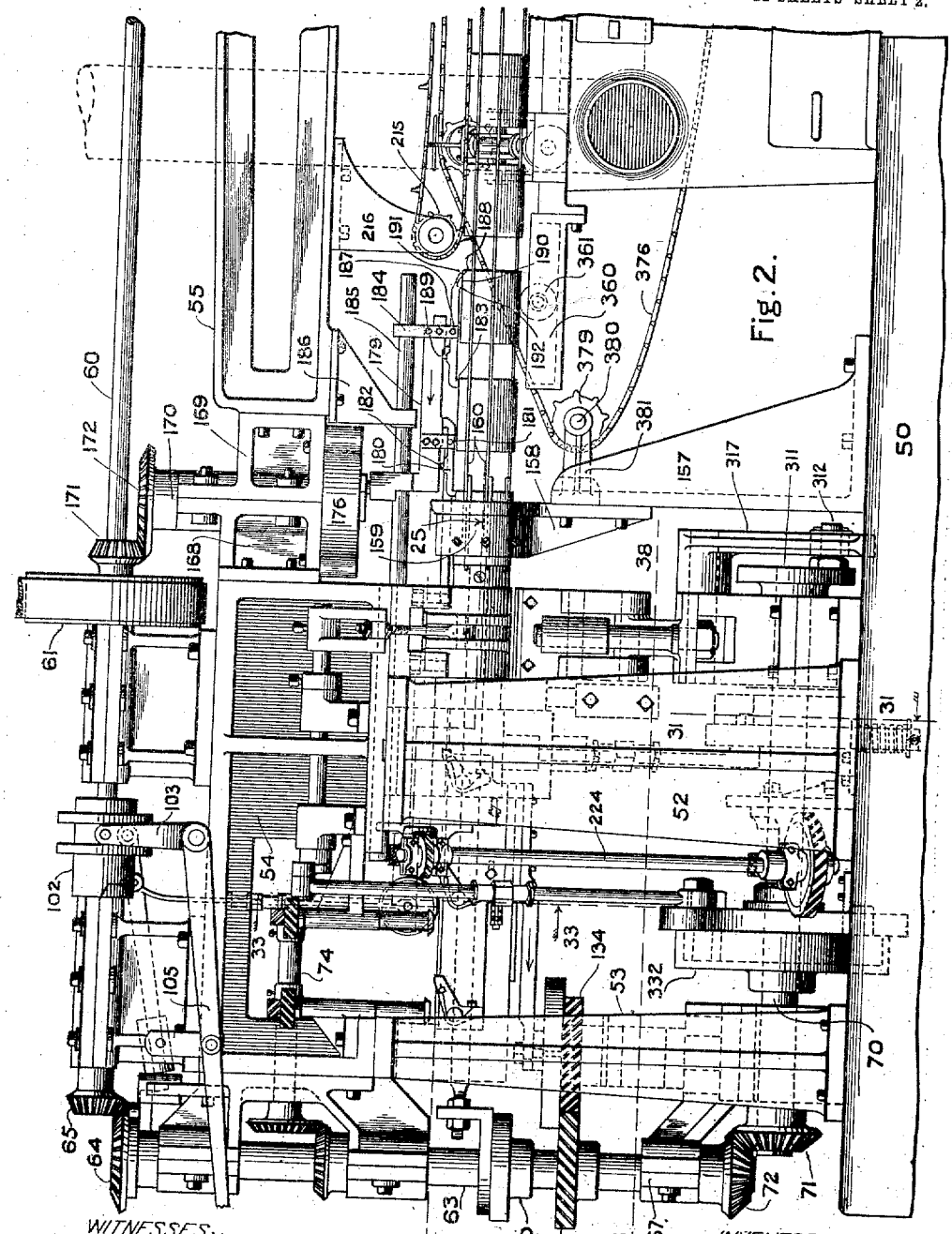
Figure 3:
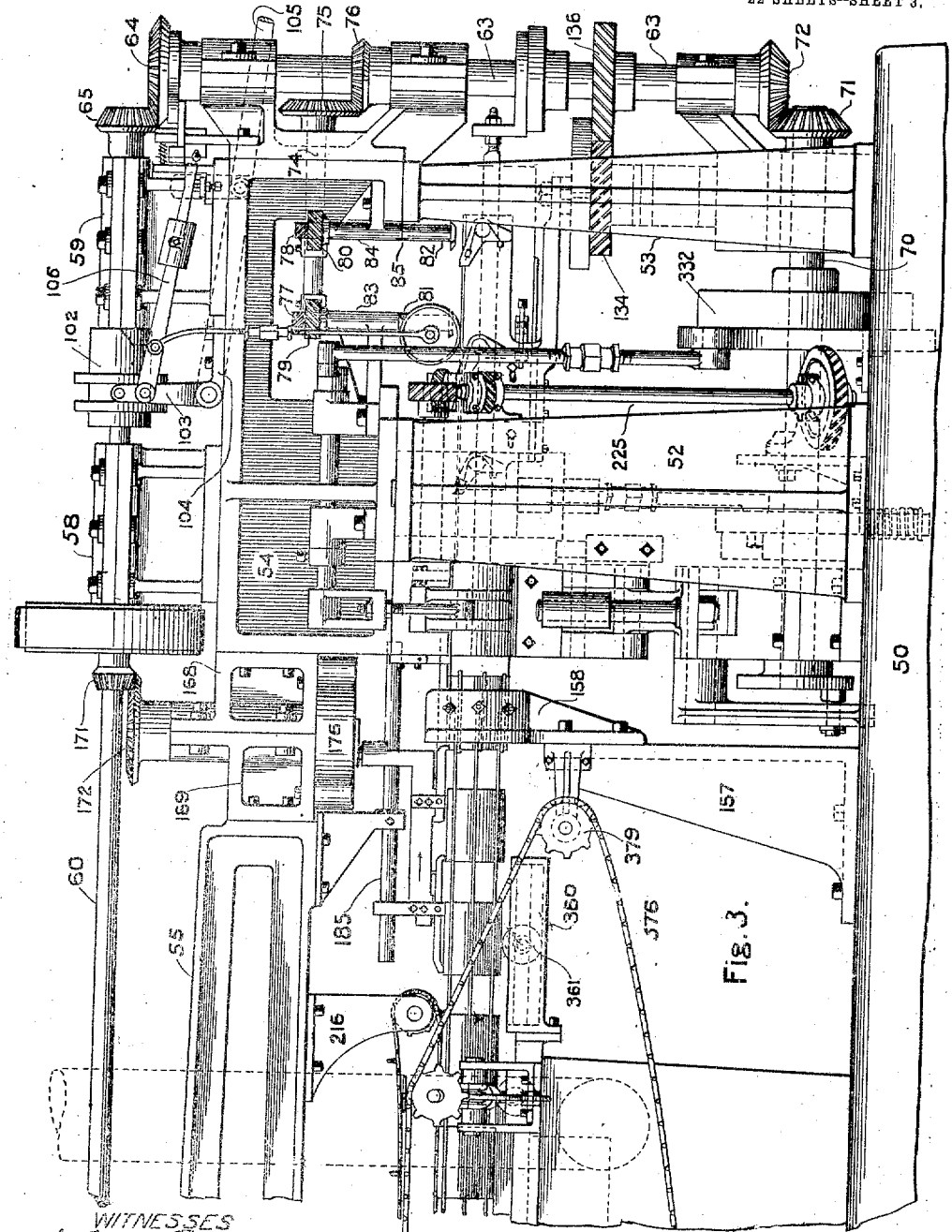
Figure 4:
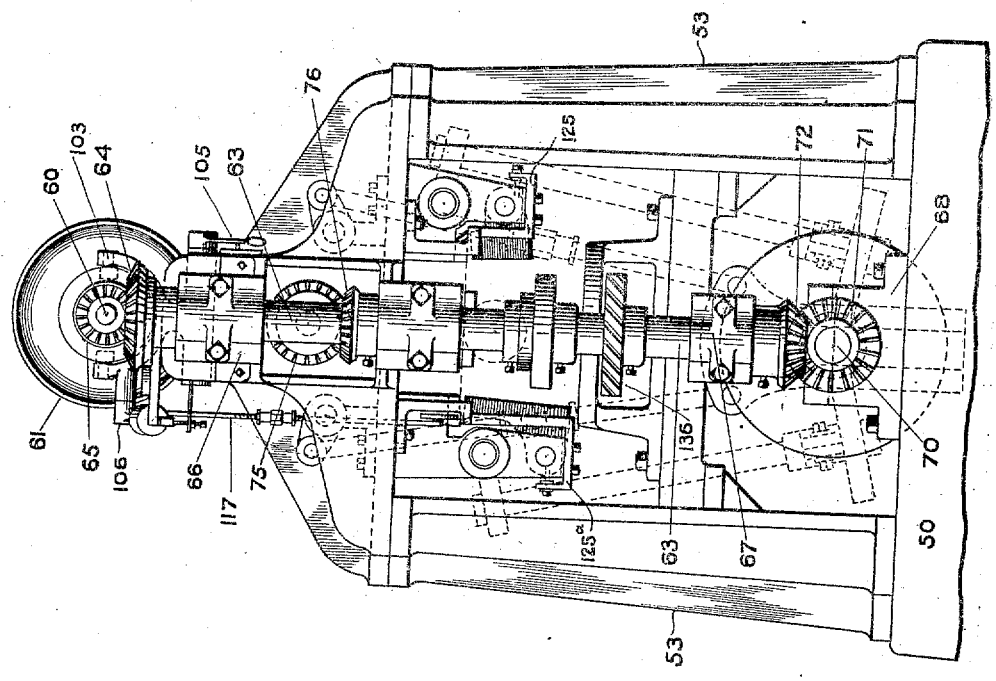
Figure 22:
Figure 23:
Figure 24:
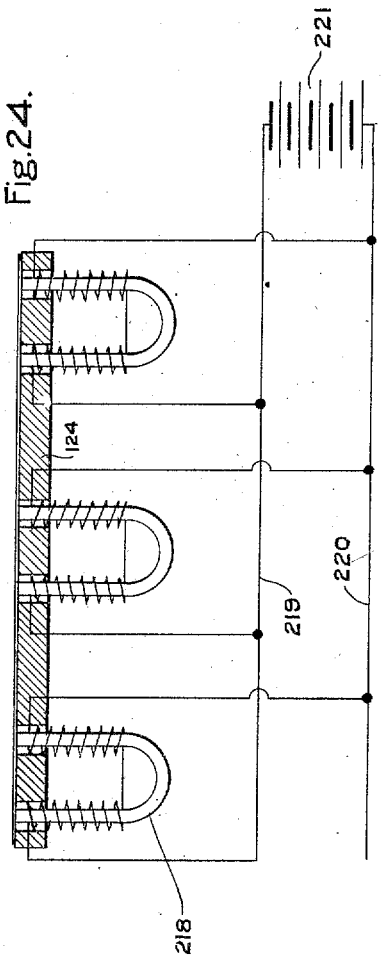
Figures 29, 30:
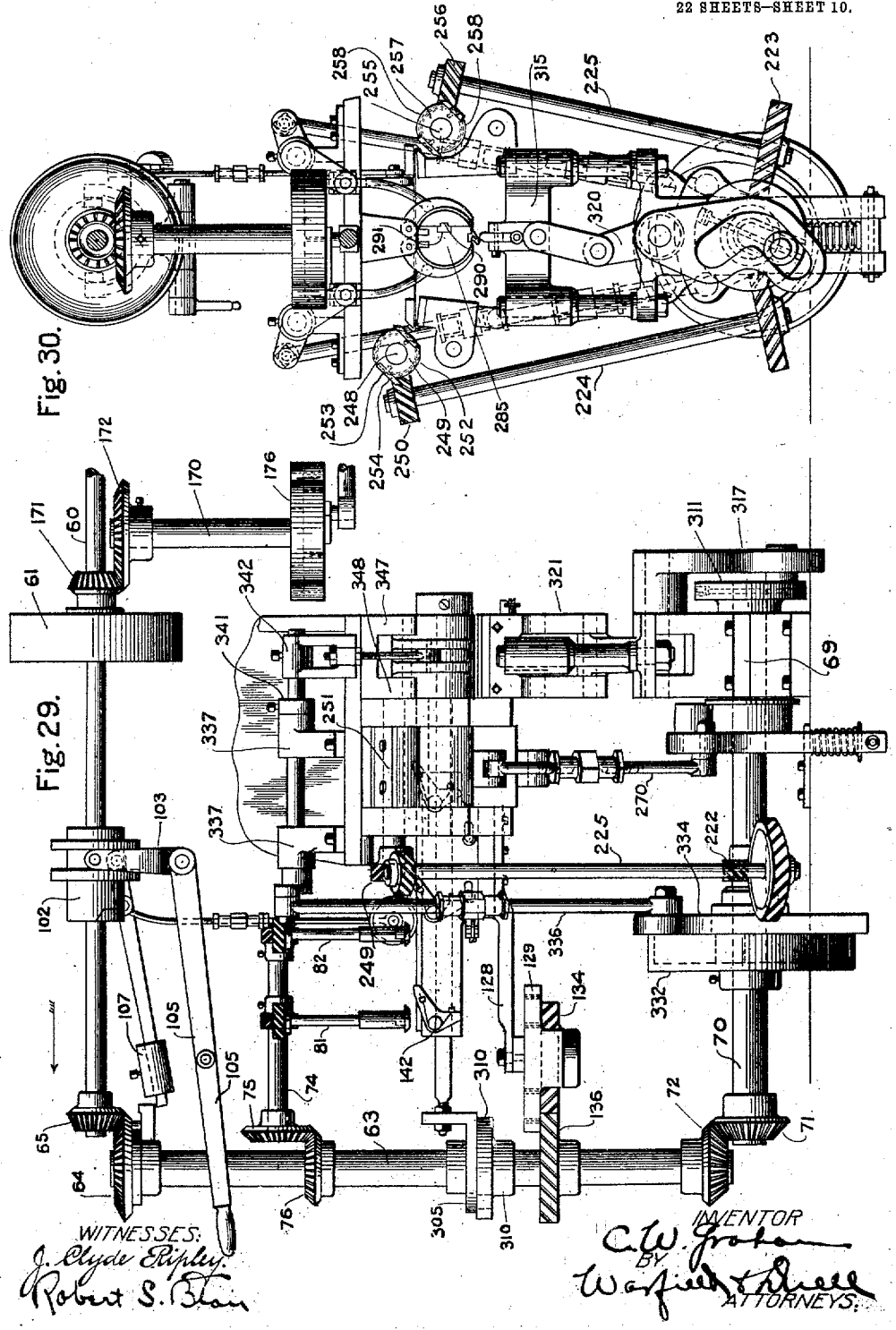

In the accompanying drawings, wherein are shown one or more of various possible embodiments of the several features of my invention: Figure 1 is a side elevation of one of the same. Fig. 2 is a similar view of certain parts shown in Fig. 1 on an enlarged scale. Fig. 3 is a view similar to Fig. 2 of the same parts, the view being taken from the opposite side of the machine. Fig. 4 is an end elevation of parts shown in Fig. 2. Fig. 5 is a detail elevation of an automatic stop mechanism. Fig. 6 is a similar view of the same parts showing the same in a slightly different position. Fig. 7 is a sectional plan taken substantially on the line 7—7 of Fig. 6. Fig. 8 is a detail view of an epicyclic gear used in this embodiment. Fig. 9 is a sectional elevation taken on the line 9—9 of Fig. 8. Fig. 10 is a detail plan view of a feed mechanism. Fig. 11 is a sectional elevation of parts shown in Fig. 10, the section being taken on line 11—11. Fig. 12 in a sectional view on an enlarged scale taken on the line 12—12 of Fig. 11. Fig. 13 is a similar view taken on the line 13—13 of Fig. 11. Fig. 14 is a diagrammatic plan indicating the operation of the mechanism shown in Fig. 10. Fig. 15 is an elevation of the same. Fig. 16 is a view similar to Fig. 14 showing the parts in a slightly different position. Fig. 17 is an elevation of the same. Fig. 18 is a view similar to Fig. 16 showing the parts at a later stage of their operation. Fig. 19 is an elevation of the same. Fig. 20 is a view similar to Fig. 18 showing the parts at a still more advanced stage of operation. Fig. 21 is an elevation of the same. Fig. 22 is a diagrammatic view of a blank supported upon a bed. Fig. 23 is a similar view showing a blank buckled in another direction. Fig. 24 is a diagrammatic sectional view of a magnetic bed and electrical connections for the same. Fig. 25 is a sectional plan taken on the line 25—25 of Fig. 2. Fig. 26 is a sectional elevation taken substantially on the line 26 of Fig. 25 in the direction indicated by the arrow. Fig. 27 is a sectional view showing certain parts appearing in Fig. 25 isolated from the surrounding mechanism. Fig. 28 is a sectional elevation taken substantially on the line 28—28 of Fig. 25 showing supporting members. Fig. 29 is a side elevation of certain parts shown in Fig. 2, the same appearing isolated from the supporting framework. Fig. 30 is an end elevation of the parts shown in Fig. 29 taken in the direction indicated by the arrow. Fig. 31 is a sectional elevation on an enlarged scale taken substantially on the line 31—31 of Fig. 2. Fig. 32 is a side elevation of certain parts shown in Fig. 31. Fig. 33 is a sectional elevation taken substantially on the line 33—33 of Fig. 2. Fig. 34 is an enlarged elevation of certain parts shown in Fig. 2. Fig. 35 is an end elevation of the same looking in the direction indicated by the arrow in Fig. 34. Fig. 36 is an elevation of certain parts shown in Fig. 35. Fig. 37 is a similar view of the same parts, showing the same at a later stage in their operation. Fig. 38 is a sectional plan taken substantially on the line 38—38 of Fig. 2. Fig. 39 is an end elevation upon an enlarged scale of clenching mechanism shown in Fig.

2. Fig. 40 is a side elevation of the same. Fig. 41 is an end elevation of certain portions of the machine looking in the direction opposite to that from which Fig. 4 is taken. Fig. 42 is a sectional plan upon an enlarged scale taken substantially on the line 42—42 of Fig. 41. Fig. 43 is a plan view of the entire machine. Fig. 44 is a diagrammatic elevation showing means of driving certain mechanisms thereof. Fig. 45 is a sectional elevation taken substantially through the longitudinal center of the machine showing solder-applying mechanism. Fig. 46 is a similar view showing a slightly different embodiment of my invention. Fig. 47 is a sectional elevation taken on the line 47—47 of Fig. 45. Fig. 48 is a similar view taken on the line 48—48 of Fig. 46. Fig. 49 is a side elevation of the portion of this embodiment of my invention remote from those parts shown in Fig. 2. Fig. 50 is a similar view of the same parts looking from the side opposite to that from which Fig. 49 is taken. Fig. 51 is a similar view of the corresponding parts in a slightly different embodiment of my invention.

Similar reference characters refer to similar parts throughout the several views.

In order to render clearer the general nature of my invention, it may here be noted that on account of the low selling price of the individual product of a machine of the nature of those with which this invention deals, it is essential that the amount of manual labor required must be small and the rate of production, high. To accomplish this object, it is proposed to provide a machine which is largely automatic in action and each division of which performs its functions efficiently and prepares the article for the next succeeding step. In such a machine, it is of marked importance that the blanks or individual members from which the article is to be formed be positively fed in such manner as to insure that they are fed singly, and that means be provided for moving the same about the machine at proper times during the various stages of its formation. It has also been found to be highly desirable to provide mechanism for automatically stopping the machine in case of the possible entering of two blanks simultaneously, or of an excessively thick blank, and thus prevent the derangement of the machine and a possibility of a considerable loss of time. Another desirable feature is the provision of means for maintaining the blanks flat upon the bed upon which they travel.

The above and other objects are attained in constructions of the nature of that hereinafter described.

In the accompanying drawings, wherein is set forth a machine embodying the above and other features of my invention, there is shown a frame comprising, broadly, a bed 50 having at one end a standard or support 51 and at the other end, pairs of supports 52 and 53. Mounted upon these latter supporting members is a casting 54, to one end of which is connected, by means hereinafter described, a girder 55, the opposite end of which rests upon the support or standard 51.

Journaled upon the above frame by means of bearings 56, 57, 58, and 59, is a main shaft 60 which may be driven from any desired source of power, as by means of pulley 61 and belt 62. A vertical shaft 63 is driven from the main shaft 60, connection being made by bevel gears 64 and 65 this shaft being journaled in a heavy bracket 66, mounted upon the casting 54 and a lower bracket 67. Journaled within suitable bearings 68 and 69 bolted to bed 50 is a counter shaft 70 deriving motive power by means of bevel gears 71 and 72 from the vertical shaft 63, as shown in Fig. 2 of the drawings. Mounted upon this framework, broadly speaking, and driven through the above shafting are the following means adapted to accomplish the objects of this invention. In this preferred illustrative embodiment the parts are arranged, in general, in the following manner: Adjacent shaft 63 and driven therefrom is suitable blank-receiving and feeding mechanism adapted to discharge the blanks singly upon a bed provided with means adapted to feed the same in flat condition to edging means mounted adjacent the supports 52. Feeding mechanism is provided, adapted to transmit the blanks from the edging means to suitable forming or shaping means positioned and driven as hereinafter described. At this stage the cam body is in the desired cylindrical form and means are provided for transmitting the same to suitable flux-applying means positioned beneath the girder 55. The body is thence carried in the same general direction to solder-applying and sweating means and, after being cleansed by suitable mechanism mounted adjacent the standard 51, is discharged in finished condition into a receiving chute 73 from which it is conveyed to any desired destination.

Recurring to the blank-feeding mechanism, it may first be noted, as tending to cast light upon the general nature of this feature of my invention, that it is highly desirable that the blanks be fed singly and at regular intervals in order to prevent derangement of the machine with a consequent loss of time. For the fulfilment of the former of the above requirements, it is proposed that the blank be fed by means which are entirely positive in action and that the necessity for dependence upon frictional engagement be obviated. To insure the fulfilment of the latter condition, I preferably provide that the parts be positively driven from a single source of power, thus providing that at each stage of the operation of the several parts, they shall occupy a definite predetermined position with reference to the remaining parts of the mechanism. It may also here be noted that in order to provide blank-feeding mechanism of the highest efficiency, it is of importance that an adjustment of the same to accommodate blanks of various sizes be possible and practicable. The above are included in the advantageous features of my invention embodied in the mechanism shown.

Referring to Fig. 3 of the drawings, there is shown at 74 a short counter-shaft driven by means of a bevel gear 75 meshing with a similar gear 76 upon the shaft 63. Shaft 74 has fixed thereon two spiral gears 77 and 78 respectively meshing with similar gears 79, 79, and 80, 80 upon the corresponding pairs of vertical shafts 81, 81, and 82, 82. These shafts are journaled in suitable pairs of brackets 83 and 84 mounted upon the lower flanges of the casting 54. Shafts 81, which terminate at their lower ends in portions of enlarged diameter, as shown at 85, are provided with supports 86 secured thereto by the upwardly projecting posts 87 pinned within the same. Adjustably secured within suitable recesses in the upper surfaces of supports 86 are abutments 88 held in position by screws 89. Similarly secured to the lower enlarged ends 90 of shafts 82 are supports 91 provided with abutments 92 and having between the upper surface of the support and the lower end of the shaft a receiving slot 93 which is preferably substantially equal in width to the thickness of the blank which it is desired to feed. Abutments 88 and 92 are respectively positioned in eccentrically projecting portions 94 and 95 of the supports upon which they are mounted.

It may here be noted that the term "laterally" is used throughout the following claims in a broad sense as denoting any motion in a direction substantially within the plane of the moving member. It may also here be noted that the blank-feeding mechanism is readily adaptable for various sizes and shapes of blanks, as the spiral gears 77 and 78 are slidable upon the shaft 74, being fixed as by screws 96. Suitable adjustable side guides 97 are provided as shown in Fig. 25 of the drawings to prevent lateral displacement of the blanks.

The operation of the above described mechanism which embodies certain features of my invention is substantially as follows: A pile of blanks 98 is positioned between the shafts 81 and 82, as shown in Fig. 10 of the drawings, the blanks being so arranged with reference to the machine as a whole as to admit of the same being supplied to the feeding mechanism from the side of the machine without interfering with the action of the same or exposing the person supplying the blanks to a chance of physical injury. Assuming that the blanks be positioned as shown in Fig. 11 and the machine to be in operation, the shafts 81 and 82 of each pair are driven in opposite directions. With abutments 88 in the position shown in Fig. 20, it will be seen that a quarter turn in the direction indicated by the arrows will throw them into the position shown in Fig. 14. With these abutments in this position, the abutments 92 upon shafts 82 are in the position shown in Fig. 14 and during this movement the lowermost blank 99 will have been engaged by the upper edges 100 of the abutments 88 and moved laterally with respect to the remaining blanks into the slot 93 beneath the shafts 82, as shown in Fig. 14 of the drawings. Another quarter turn will bring the parts into the position shown in Fig. 16 in which the abutments 88 are turned inwardly away from the adjacent edge of the lowermost blank 99 and as the same has been moved to such an extent as to be beyond the edge of the circular portion of support 86, it drops downwardly as shown in Fig. 17 of the drawings. A further quarter turn causes the abutments 92 to engage the adjacent edges of the blank 99 and throw the same laterally to a position beneath the supports 86, as shown in Fig. 19, the chance of interference of these abutments with this movement being reduced to a minimum by the beveled formation of the lateral surfaces thereof, as shown at 101. During the last quarter turn, completing the revolution of the shafts 81 to the position which they were originally assumed to occupy, shafts 82 will make a corresponding movement and arrive at the position shown in Fig. 20 in which the supporting projections 95 are removed from beneath the adjacent edge of blank 99, thus permitting the same to drop into the position shown in Fig. 21. In this manner the blank is isolated from the remainder of pile 98 and, as the entire operation of the mechanism is positive, it will be seen that the chances of double feeding are reduced to a minimum. It is to be understood that the width of the slot 93 and the distance which the abutments 88 and 92 project above the corresponding supports may be adjusted so as to act most efficiently with the desired thickness of blank.

It will thus be seen that I have provided simple and easily adjustable mechanism which is entirely positive in action. The power required to actuate this feeding mechanism, moreover, is slight, and, owing to the driving of the several parts by positive gears from a single source of power, the regularity of its action is assured. It will also be seen that this mechanism is easily supplied with material and that the same may be adjusted for blanks of various sizes with a minimum of effort. Also, this mechanism acts as an automatic detector of blanks of excessive thickness, as the same will not be fed thereby unless they fit within the slot 93. The several parts, moreover, of this feeding mechanism are so few in number and simple in construction that the same is not likely to become deranged when subjected to hard practical use.

Although the blank-feeding mechanism above described is positive and certain in action to a marked degree, yet, if, by any possibility, as by wearing of the parts of the feeding mechanism, a blank of excessive thickness or two blanks should slip through, it is of the utmost importance that the machine be stopped immediately in order to prevent jamming of the parts or possible injury thereto. This stopping mechanism should, preferably, be automatic in action, as it will clearly be seen that to be of practical value, it is necessary that the same be practically instantaneous in action and independent of the supervision of an attendant. Another feature which is considered of importance in mechanism of this type is that the same be adjustable so as to accommodate blanks of varying thickness and operate only at desired times. The above and other advantages are inherent in automatic stop mechanism of the nature of that herein described.

Referring now to Fig. 2 of the drawings, there is shown mounted upon the main shaft 60 a clutch 102, the position of which is manually controllable as by means of a shipping fork 103 pivotally mounted within bracket 104 upon the frame of the machine and adapted to be actuated by means of a hand lever 105. This clutch controls the connection from the driving pulley 61 to the vertical shaft 63, and thus is adapted to stop a large portion of the machine, including the feeding mechanism, when thrust into an inoperative condition. Pivotally mounted upon shipper fork 103 is a stop lever 106 having thereon a slidable weight 107 adapted to be fixed in position by means of a screw 107ª. Fixed upon the vertical shaft 63 below the bevel gear 64 is a cam 108 substantially of the shape shown in Fig. 7 of the drawings. This cam is adapted to coact with a wiper arm 109, roller 110 being preferably provided at the point of contact, and the wiper being pivotally journaled on a bracket 111 bolted to the frame of the machine. A spring 112 positioned upon a pin 113 is normally compressed between the lug 114 formed upon wiper arm 109 and a bracket 115 in which the pin is mounted, thus tending to hold the roller 110 in contact with the cam. Formed upon wiper arm 109 is an upwardly projecting abutment 116 adapted in the normal position of the several parts to swing over the free end of lever 106, as the wiper arm is oscillated by cam 108. Pivotally mounted upon lever 106 is a rod 117 provided with a turn buckle 118 so as to permit the same to be adjusted in effective length. This rod has journaled upon its lower end a roller 119 and is slidably mounted within a guide 120 so as to prevent its lateral displacement. The downward movement of lever 106 is limited by a set screw 121 mounted in a lug 122 formed upon the frame of the machine and provided with a suitable lock nut 123. Upon the passage of a single blank of normal thickness over the bed 124 of the machine and beneath the roller 119, which is normally held by gravity in the path thereof, the lever 106 is swung upwardly to an extent depending upon the thickness of the blank. This movement is, under normal conditions, insufficient to swing the outer squared end of the lever 106 within the path of travel of abutment 116, but upon two blanks being simultaneously forced beneath this roller, as shown in Fig. 6, the stop lever will be raised to such an extent as to be engaged by the swinging abutment 116, with the result that the shipping fork 103 is thrown into such position as to throw out clutch 102 and disconnect a large portion of the machine from its source of power. Obviously, this result would also be accomplished by the entry of a blank of excessive thickness beneath roller 119. The several parts of this mechanism are adjustable in a manner which should be obvious from the above description, and by means of slidable weight 107 any desired pressure may be brought to bear upon the rod 117 so as to obviate the chance of the same causing the stop mechanism to act when such action is not desired, as by reason of the roller jumping from the bed of the machine upon the sudden entry of a blank beneath the same.

It may here be noted that throughout the following claims the expression "thrown out" is used as descriptive of the state of the clutch or equivalent mechanism when the same is in open or inoperative condition and the power disconnected from the machine or certain parts thereof.

It will thus be seen that I have provided a simple automatic stop mechanism which will accomplish the objects desired in regard to such mechanism, as above indicated. It will also be seen that the several parts of this mechanism are adjustable and yet are of such simple construction as to render it durable under conditions of hard use. Moreover, the above described mechanism is entirely positive in action, friction not being depended upon in any manner and the several parts act automatically without the need of an attendant.

After the single blank has been dropped upon the bed of the machine, it is of importance that simple and yet reliable means be provided for moving the same from the one part thereof to another. Unless each blank is fed at the proper time and to the proper point, the blanks are likely to accumulate and cause jamming of the parts of the machine with a consequent stoppage thereof and waste of time and material. This feed must be positive and not depend upon friction if the highest efficiency and certainty of action is to result. It is also of importance that means be provided whereby the blank, after being bent into the form of a can body, is guided with certainty to the desired place and yet is readily accessible for purposes of inspection and in such position as to be best exposed to the action of the means for completing its formation, as soldering and the like. The above are found among the advantageous features of the feeding and guiding mechanism hereinafter described.

Referring now to Figs. 4 and 33 of the drawings, there are shown angular supports 125 and 125ª adjustably mounted upon the frame of the machine. These supports comprise guides or auxiliary beds 126, adapted to support the lateral edges of the blanks.

Mounted upon a portion of the machine hereinafter described, in detail, is a crosshead 127. This crosshead is preferably driven through an arm 128 by means of an epicyclic gear comprising the fixed annular gear 129 bolted upon a cross bar 130 stretched between standards 53, the inner spur gear 131 and the crank arm 132. A stud 133 bearing spur gear 131 is fixed upon a driving gear 134 mounted by a stud 135 upon cross bar 130. This gear is provided with spiral teeth and meshes with a corresponding gear 136 upon vertical driving shaft 63. As the pitched circle of the inner gear 131 is of one-half the diameter of that of the annular gear 129, and the effective length of crank arm 132 is equal to the distance between the center stud 133 and the axis of gear 134, it will be seen that the pin 137 of crank 132 has a path of travel parallel to and co-incident with the longitudinal central plane of the machine. The crosshead 127 is thus reciprocated at the desired rate of speed and has a suitable length of travel, owing to the long throw of the epicyclic gear above described. Crosshead 127 preferably comprises a pair of slides 138, resting upon the lower flanges of the support and connected beneath the same as by plate 139. Secured within the recessed sides of slides 138, are bars 140, each having mounted thereon a side wall 141. Pivotally mounted upon each of the side walls 141 of crosshead 127 are a series of dogs or pawls 142 normally spring-pressed so as to project slightly above the plane of the upper surface of bed 124, as shown in Fig. 26 of the drawings. These pawls have a squared end in their direction of feed and present an inclined surface 143 in the opposite direction, thus being adapted upon being thrown in the direction indicated by the arrow in Fig. 26 to engage with the projecting edges 144 of the blanks as shown at 145 and propel the same as indicated in Fig. 25 of the drawings. Upon the crosshead being retracted, however, the inclined faces 143 of each of the pawls engages the forward edge of the blank passing to the rear thereof and is depressed and passes beneath the same without moving it. Upon reaching the rearward limit of its path of travel, assuming the direction indicated by the arrow in Fig. 26 to be forward, the pawls are again snapped up into place at the rear of the blanks beneath which they have passed and, upon a forward movement of the crosshead again taking place, these blanks are once more fed for the desired distance, each blank being propelled by the pair of pawls next forward from those last engaging it. It will thus be seen that as the crosshead moves to and fro, it feeds each blank throughout a certain predetermined distance and leaves each of these blanks in such position as to be taken up by the next forward pair of pawls and again fed forward, thus resulting in an intermittent movement of the blanks in a direction indicated by the arrow in Fig. 26. There are preferably provided three pairs of the above described spring-pressed pawls, the middle or second-acting pair of the same depositing the blanks substantially in the position occupied by the right hand blank in Fig. 25 of the drawings. In this position, the blank is acted upon by suitable edging mechanism, hereinafter to be described in detail, and is subsequently engaged by the forward pair of pawls and propelled to a position upon a supporting horn or mandrel 146. In this position the blank is subjected to a forming or shaping step in which it is forced into a cylindrical form and the bent edges thereof interlocked by mechanism hereinafter described. Subsequent to this step, the blank or "body," as it may now be termed, is ejected from the horn in a forward direction, still assuming the arrow in Fig. 26 as indicating a forward line of movement, by means of rods 147 bolted, as shown at 148, upon the crosshead 127. As these rods are identical, one only will be described. Rod 147 is provided at its forward end with a slot or recess 149 pivotally mounted within which is a pawl 150 engaged at a rearwardly extending projection 151 by means of a flat spring 152 fixed to the rod within the slot. The forward end of pawl 150 has a squared recess 153 adapted to take against the rear of the can body, shown at 154, when driven into engagement therewith. Upon the rear side of the upwardly projecting portion of pawl 150 the surface is smooth and inclined, as shown at 155, so as to adapt the pawl or dog during its rearward movement to be compressed by the can body beneath which it passes, without moving the same. The rods 147 driven as described from crosshead 127 thus feed a can body with each forward movement from the horn 146 in a general forward direction. It will thus be seen that the above feed is positive in action and that the blank or can body is fed throughout a definite predetermined distance. It will also be seen that the spring-pressed dogs 142 and 150 may, in the well known manner, be provided with adjustable springs so as to adapt the same readily to be depressed during their rearward movement and yet to snap quickly and strongly into their raised positions when they have passed the rear edge of the blank.

From the horn 146, the can bodies are propelled by the pawls 150 into what may be termed a "cage" 156 preferably constructed as follows: Bolted to a standard 157 upon the bed 50 of the machine is a frame 158 having a substantially circular upper portion 159, to which are secured a series of wires 160. It may here be noted that the term "wire" is used throughout this description and the following claims in its generally accepted sense as descriptive of a member possessed of a large degree of flexibility or resiliency and of a considerable length with reference to its other dimensions. At the forward end of the machine there is formed in the standard 51 a passage 161 through which the wires pass, as shown in Fig. 49 of the drawings. Wires 160 are preferably secured at their forward ends to a series of rods 162, being turned outwardly in a radial direction through heads 163 formed upon the rods and adjustably held in position by nuts 164 tapped thereon. Rods 162 are slidably mounted within a frame 165 bolted to the standard 51, as shown in Fig. 41 of the drawings. The outer or forward ends of rods 162 are screw threaded and provided with nuts 166 adapted to compress spiral springs 167 between themselves and the adjacent surface of the frame 165, thus providing an adjustable spring tension upon the wires 160 of the cage. A readily adjustable guiding means is thus provided, which is adapted to receive a can body as it is ejected from the horn 146 by pawls 150, to support and guide the same throughout the several remaining stages in the formation thereof, and finally to deposit it in finished form in the receiving chute 73 shown in Fig. 1.

After the can body is forced into the rear end of the cage 156, the same is fed in a forward direction by the following means: Bolted to casting 54 is a casting 168 adapted, together with a similar casting 169 bolted to girder 55, to form a rigid connection between these members and to provide a bearing for a vertical shaft 170 deriving power from the main shaft 60, as by means of bevel gears 171 and 172. Upon the lower end of vertical shaft 170 is fixed a crank 173 having journaled thereon, as by means of pin 174, a spur gear 175 intermeshing with an annular gear 176 bolted to the castings 168 and 169, as shown in Fig. 2. Fixed to gear 175 and adapted to rotate therewith is a crank 177 having pivotally connected to its inner end at 178 a feed rod 179. As will readily be seen from the proportion of the gears comprising the above epicyclic gear, the pivotal pin 178 will travel in a rectilinear line lying in the central longitudinal plane of the machine. The feed rod 179 which is thus reciprocated in a straight line, is provided with a feed pawl 180 pivotally mounted thereon, as by means of straps 181 and having its forward end upturned so as to rest against the lower surface of the rod. Positioned between the rearwardly extending end of pawl or dog 180 and the adjacent surface of feed rod 179 is a spiral spring 182. The rear surface of the pawls is curved and this end projects downward as shown at 183. Adjacent the forward end of feed rod 179 is secured a strap 184 extending upwardly and embracing a guide rod 185 supported in bracket 186, thus holding the feed rod in the desired position during its reciprocating movement. To the lower projecting ends of strap 184 is secured, as by means of a pivotal pin 187, a dog 188, the rearwardly extending end of which is formed substantially the same as the corresponding portion of dog 180 and is likewise provided with a spring 189 tending to depress this end. The forward end, however, terminates in a downwardly inclined foot 190 having a blunt forward surface 191 and an inclined rear under surface 192.

In the operation of the above described mechanism: a feed rod 179 moves to and fro, driven by the epicyclic gear above described, the pawls are adapted at each forward movement to feed the can bodies adjacent thereto. Assuming the feed rod to be moving in a rear direction indicated by the arrow shown in Fig. 2, the rounded rear ends of pawls 180 and 188 and the inclined surface 192 of the forwardly extending portion of pawl 188 engage the forward edges of the adjacent blanks or bodies and are moved thereby into such position as to pass over the same without moving them. Upon reaching the rearmost limit of their path of travel, however, the rear projections 183 and the forwardly projecting end 190 take against the can bodies over which they have just passed and, upon moving forwardly, propel the same throughout the desired distance. It will thus be seen that, as feed rod 179 is reciprocated by the above described mechanism, at each forward movement three can bodies are fed throughout the desired distance.

Journaled within bracket 193 upon the girder 55 is a vertical shaft 194 driven from shaft 60 by spiral gears 195 and 196, as shown in Fig. 50 of the drawings. Fixed upon shaft 194 above its lower bearing 197, which is bolted to the standard 51, as shown in Fig. 49, are adjustable collars 198, having therebetween a bearing 199 loosely held upon the shaft by sleeves 200. Between these sleeves is fixed upon the shaft a spiral gear 201 meshing with a similar gear 202 upon a shaft 203 journaled in the bearing 199 and having upon its end a bevel gear 204 intermeshing with a similar gear 205 upon a shaft 206 journaled in a hanger 207. This hanger is slidably mounted upon the lower surface of the girder 55 as by bolt 208 and slot 209 and is adjustable as by means of a set screw 210 threaded through the projecting lug 211 and rotatably mounted in a depending lug 212 upon the lower surface of the girder. Shaft 206 has fixed thereon a sprocket wheel 213 adapted to support and drive a sprocket chain 214 extending over a sprocket 215 mounted within a hanger 216, as shown in Fig. 2 of the drawings. Chain 214 is provided with a series of outwardly projecting arms 217 so spaced as each to take against the rear edge of a can body and propel the same in properly spaced relation, as is shown in Fig. 50, throughout the length of the cage.

It will thus be seen that I have provided means for positively feeding the blanks and can bodies throughout the entire length of the machine in such manner as to place each of the same in the desired position at the desired time and yet leave the same readily accessible throughout their entire passage and in such position as most efficiently to be acted upon at all stages of the formation of the body. It will also be seen that this feeding mechanism is readily adjustable and that the several parts thereof are simple and easily replaced. The guiding cage, moreover, is of simple construction and while positively directing the can bodies is yet of such flexible nature as to be unaffected by any possible slight irregularity in the bodies fed therethrough or by any expansion due to change of temperature of the parts.

Even though the blanks be fed singly upon the bed 124 and are of substantially uniform thickness, nevertheless they are likely to be slightly uneven, and for this reason would not lie flat upon a plane surface. This might result in the failure of the feeding mechanism properly to propel the blanks and accurately to position them for subsequent operations. For this and other reasons, I have found it highly desirable that the blanks be held flat against the bed. Such a result, however, is difficult of accomplishment by mechanical means as any mechanism tending to encumber the space above the bed or unduly to increase the friction between the same and the superimposed blank is to be avoided. When the blank is of iron or other magnetic metal, or is what is commonly known as "tin", which is generally iron coated with tin, the above difficulties may be avoided and many advantages attained in constructions of the general character of that shown in Fig. 24 of the drawings.

Projecting through the bed 124 at preferably three portions thereof, as indicated in the drawings, are the poles of horse shoe magnets 218. These magnets are preferably slightly spaced from the surrounding bed so as to avoid short-circuiting the magnetic flux, and are positioned with their poles substantially flush with the upper surface of the bed. Although permanent magnets may be used for this purpose, it has been found that electro-magnets are better suited to accomplish the desired result, as the same are not likely to deteriorate in use and the strength thereof may be adjusted throughout wide limits by suitable changes either in the current or the windings used. These magnets are preferably connected in parallel across the leads 219 and 220 of a battery or other source of electrical current 221, which may be positioned at any convenient place, as upon or adjacent to the machine. A suitable number of series of magnets is provided at the proper intervals along the bed 124 so as to hold the blank flat against the same throughout its entire travel thereover. Although any desired number of magnets may be arranged transversely with respect to the bed of the machine, it is found that three are well suited to accomplish the desired result inasmuch as the three corresponding points would determine a plane and thus insure that the blank lie within a plane parallel to the upper surface of the bed. The magnets 218 being excited to the desired degree, the blanks are held flat against the bed and thus are stretched into their desired position, the lateral extremities projecting within the path of travel of the propelling pawls. Moreover, as the blank is held against the bed with a considerable degree of firmness, the spring-pressed pawls pass beneath the same during their retraction without lifting the blank or moving it from its position. In Figs. 23 and 22 are shown the bed with a blank resting thereon, buckled respectively upwardly and downwardly, it being assumed that these views represent a portion of the bed 124 before the current is turned on and the blank attracted.

It will thus be seen that I have provided simple and extremely compact means for holding the blank upon the bed of the machine in the desired position and insuring that the same be acted upon by the feeding mechanism in the desired manner. It will also be seen that the several parts of this mechanism are easily accessible, as for purposes of repair, and may readily be replaced. Other advantageous features are that the above means are adapted to act upon blanks of any size or thickness without adjustment, and that the same are uniformly held down at the desired points without encumbering the space above the bed.

As is well known, in connection with machines of the type with which this invention generically deals, one of the first steps after the blank has been fed to and correctly positioned upon the bed is to bend or flange the edges thereof. In this connection, it may be noted that I find a prime requisite of "edging" mechanism to be that the blank be firmly held and, if possible, stretched taut, thus insuring that the slack is taken out and that the flanges are of uniform width. It is also of value, both in the matters of economy in time and quality of work, that the edging be done at a single stroke. The above are among the many advantageous results attained in mechanism of the following nature. Referring now to Fig. 29 of the drawings, there is fixed upon shaft 70 a gear 222 adapted to mesh with similar gears 223 mounted upon each of shafts 224 and 225, as shown in Fig. 35. Shafts 224 and 225 as shown in Figs. 34 and 38 are journaled at their lower ends within bearings 226 loosely mounted upon a shaft 70 and held in the desired position by means of nuts 227 upon bolts 228 passing through curved slots 229 in an upright plate 230 straddling the shaft 70 and bolted to the bed of the machine, as shown at 231. The upper end of shaft 224 is journaled in bearings 232 and 233 formed upon a bracket 234 having an adjustable connection with a hanger 235, as by bolts 236 and slots 237. A similar mounting is provided for the upper end of shaft 225 comprising bearings 238 and 239 having respective arms 240 and 241 adjustably mounted by bolts 242 and slots 243 upon a hanger 244 adjustably supported by bolts 245 from the frame of the machine. The bearings 238 and 239 and their supporting parts are clearly illustrated in Figs. 34, 35 and 36. Journaled within hanger 235, adjustably mounted as by bolts 246 and slots 247 from the casting 54, is a shaft 248, having thereon a spiral gear 249 adapted to intermesh with a similar gear 250 upon shaft 224. Fixed upon shaft 248 is what may be termed an "edger" 251. This edger comprises a sleeve 252 having adjustably secured thereon, as by screws 253, blades 254 preferably two in number. The function of these blades will be set forth more at length hereinafter. Upon hanger 244 is mounted a shaft 255 driven from a gear 256 upon shaft 225 by gear 257 and having fixed thereon an edger 258 provided with blades similar in construction and function to those upon the edger above described. Fixed upon hanger 235 is a plate or clamping member 259, the outer lateral surface of which is inclined in a direction substantially tangential to the adjacent edger 251. Upon the depending arms 260 of hanger 235 is pivotally mounted a swinging jaw 261 provided with a face substantially of the form shown in Fig. 31 of the drawings. Hanger 244 is likewise provided with a clamping member 262, preferably substantially rectangular in cross section, and upon the depending arms 263 of this member is pivotally mounted a swinging jaw 264 provided with a clamping member 265, the outer lateral surface of which, with respect to the longitudinal center of the machine, is inclined in a direction substantially tangential to the adjacent edger 258. The swinging jaws 261 and 264 are actuated by the following mechanism: Straddling shaft 70 and normally held in a depressed position, as by means of a spiral spring 266 upon a guide rod 267, is a cross head 268 connected by adjustable links 269 and 270 with the swinging jaws 261 and 264 respectively. A roller 271 mounted upon cross head 268 is adapted to coact with a cam 272 fixed upon shaft 70 by means of which the desired reciprocating movement of the cross head 268 and oscillation of the swinging jaws is attained.

The operation of the above described mechanism is as follows: Assuming the blank to be fed by the previously described means to a point in which it rests upon the bed 124, with its lateral portions in contact with the clamping members 259 and 262, the jaws 261 and 264 are swung upwardly in such manner as to clamp the blank between their upper surfaces and the fixed clamping member. This swinging movement not only results in the blank being firmly clamped, but also tends to take out any slack which may be in the same and stretch it taut for the next succeeding operation. The several clamping members are so positioned as to permit the extreme lateral edges to project slightly beyond the same and within the path of travel of blades 252. The several gears are so arranged and proportioned as to cause the edging blades 252 to strike these lateral projecting edges as soon as the swinging jaws are thrown into their closed or uppermost position. The rotary movement of one of the blades 252 bends the adjacent edge 273 against the inclined lateral surface of clamping member 259, as shown in Fig. 31 of the drawings. It may here be noted that the term "rotary" is used throughout this specification and the following claims with reference to the movement of the edging mechanism immediately above referred to as descriptive of a type of action in which the parts are driven so as to swing or gyrate about an axis without a reverse of direction of travel. In like manner, the downwardly-passing blade 252 flanges the remaining edge 273 against the outer surface of the swinging clamp 265. Immediately upon the above operation taking place, the crosshead 268 is permitted by cam 272 to be drawn downwardly by spring 266, thus retracting the jaws 261 and 264 to such a point as to permit the edged blank to be fed forward by the previously described means, and the succeeding blank to be brought into operative position. The above cycle of operations is then repeated, the blades 252 serving to edge this blank in the manner above described. The several gears are so proportioned as to bring one of the blades 252 upon each edger opposite the clamping members once during each revolution of shaft 70, and it will thus be seen that for every revolution of this shaft, a blank is edged, the blades of each edger each acting upon alternate blanks.

It will thus be seen that I have provided simple and efficient edging mechanism, in which the edger blades pass at a consistently fixed and yet readily adjustable distance from the clamping members. It will also be seen that the swinging or rotary edger above described avoids a waste of time for the retracting of the blade. Also, owing to the absence of reciprocating edging members, there is less vibration and waste of power in the machine. Another advantageous feature is that, as above indicated, the swinging clamping edges put the blank under tension, thus assuring that the edges flanged are of a constant width. The edge, moreover, is bent with a single blow and the angle at which the same is turned is constant, being determined largely by the shape of the adjacent clamping member. Another advantageous feature lies in the fact that the entire edging mechanism is readily adjustable to accommodate blanks of varying widths, as it is necessary merely to loosen the above-mentioned bolts and move the brackets and associated parts to the desired positions, the several gears upon shafts 224 and 225 swinging about and remaining in mesh with their co-acting gears. It may also here be noted that the edging blades are readily detached, as for the purpose of grinding and may be replaced, if necessary, with a minimum of labor and loss of time.

A highly desirable feature in machines of the general type herein set forth is that an elastic pressure be brought to bear upon the blank while at rest upon the bed or other supporting surface and in position to be acted upon by the adjacent mechanism. This I have found to be most simply and efficiently accomplished by providing a resilient means of support for the bed, pressing the same against a fixed superimposed member.

Referring now to Fig. 28 of the drawings, there is shown as secured to the casing 54 a supporting arm 274 preferably held in position in the following manner: Passing through a flange 275 is a screw 276 taking into the casting as shown at 277, and provided with a portion of an enlarged diameter 278 slightly greater in length than the thickness of the flange. In this manner, when screw 276 is driven into the casting so as to bring the shoulder 279 firmly against the same, the support 274, the opening through the flange of which is of slightly larger diameter than that of portion 278 of the screw, is mounted in such manner as to have a slight vertical play with reference to the frame of the machine. The forward end of support 274 is resiliently mounted upon a cross bar 280 stretched between the standards 52 as follows: Screw 281 is tapped into the lower surface of the support and provided at its lower end with a cup-shaped member 282 adapted to rest upon the cross bar and to abut against a spring 283 coiled about the screw. In this manner, the forward end of the support is mounted so as to cause the same to press upwardly with any desired force, this being adjustable by means of the screw. The upward movement of support 274, upon which is mounted the bed 124, is limited by an abutment 284 secured to casting 54, as shown in Fig. 31 of the drawings. The action of these parts during the passage of a blank is as follows: Assuming the blank to be fed forwardly, the same passes between bed 124 and the abutment 284, the pressure between these parts being readily adjustable as above indicated so as to hold the blank with any desired degree of firmness consistent with the ready passage thereof. From the bed 124, the blank is fed out upon the expansible mandrel or horn 146 as previously described, it being here noted that the abutment 284 projects beyond the bed and is adapted to contact the rear end of the horn.

It will thus be seen that I have provided simple and easily adjustable means for holding the blank in the desired position, with any desired degree of pressure, and thus prevent the same from shifting about the bed. It will also be seen that by the above-described means, these results are attained without encumbering the space above the bed or using complicated mechanism. Another meritorious feature is that the upward movement of the support and the horn 146 is rigidly limited, the advantages of which feature will be apparent from the description hereinafter given.

At this point the construction of the mandrel or horn 146, which embodies certain features of my invention, and the means whereby this horn is expanded will be explained with special reference to Figs. 25 to 28 of the drawings.

Referring now to Fig. 27, it will be noted that upon the forward end of the support is formed a substantially semicylindrical enlargement 285, the cross section of which is shown in Fig. 30 of the drawings. Within this enlargement, wherein are slidably mounted the feed rods 147, are formed recesses 286 adapted to house the heads of screws 287, which are slidably mounted therein in such manner as to compress the springs 288 between their heads and the bottom walls of the recesses. Screws 287 are tapped into a complementary member 289, the inner face of which is provided with a groove 290 substantially opposite a slightly wider groove 291 in the co-acting face of the member 285, as shown in Fig. 30 of the drawings. Fixed to member 289, within the groove 290, as by means of pins 292, are a pair of blocks 293, the forward faces of which are inclined as shown at 294. Fitting groove 291 is a rod 295 which is held in position within a groove 296 in the support by means of screws 297 and 298 passing through the slots 299 and 300. Pinned to the forward end of this rod are blocks 301, the rear faces of each of which are inclined and adapted to co-act with the inclined forward faces of blocks 293. Rod 295 is adjustably connected, as by means of nuts 302 and 303, with a flange 304 upon a slide 305, slotted as at 306 in such manner as slidably to embrace the shaft 63. A reciprocating movement is imparted to this slide by means of a roller 307 upon the pin 308 co-acting with a horizontal cam groove 309 formed in the upper surface of a cam 310 fixed upon the vertical shaft 63.

The operation of the above described mechanism is as follows: The enlargement 285 and the complementary member 289, as will be readily seen, are movable with relation one to another in a lateral direction, the movement of member 289 being guided by screws 287. Springs 288 tend to hold the member 289 at the innermost limit of its movement toward the enlargement 285. The slidable rod 295, however, actuated as above described, tends, by means of the co-acting blocks or wedges 293 and 301, upon the slide being driven in a rearward direction, to force the member 289 away from member 285, thus expanding the horn. Upon slide rod 295 being moved in the opposite direction, however, the blocks 293 are released by blocks 301 and all slack or lost motion is taken up by springs 288, thus contracting the horn. It will thus be seen that the above described mechanism, while avoiding the use of complicated parts, nevertheless causes an expansion and contraction of the horn for each revolution of the shaft 63. It will also be seen that the horn 146 may be caused to expand between any desired limits by adjustment of the rod 295 within flange 304, thus altering the normal position of blocks 301 with reference to blocks 293. The tension of contracting springs 288, moreover, is readily adjustable by means of screws 287. Other advantageous features of this mechanism are that no parts project beyond the surface of the horn and that there is no chance of any of the above described mechanism projecting into the path of travel of the blank. The positive action in the expansion of the horn is also of peculiar value, as will be apparent from the following description. It may here be noted that the terms "expand" and "contract" are used throughout this specification and the following claims with a broad meaning as denoting any change of condition whereby a member, considered as a whole, becomes respectively larger or smaller. As tending to cast light upon the nature of that feature of my invention relating to the mechanism whereby the blank is bent about this horn, it may first be noted that it is of prime importance that the blank be smoothly stretched in position before the expansion of the horn. It is also highly desirable that the blow whereby the interlocked flanges of the blank are clenched in position be struck with considerable force. Due to these facts, the parts must be heavy and, in order to maintain the desired speed, a quick return must be provided. The above are among the advantageous features of mechanism of the following nature: Referring now to Fig. 2 of the drawings, the lower shaft 70 terminates in a heavy crank disk 311 provided with a pin 312 mounted within a slot 313 in the face thereof and adjustable, as by means of the threaded rod 314, so as to provide for a variable throw. Journaled in a bearing 315 mounted indirectly upon the bed 50 is a short rock shaft 316 having fixed upon its forward end a heavy crank 317 provided with a curved slot 318 fitting a roller 319 upon pin 312. Rock shaft 316 has fixed thereon a second crank 320 connected by means of the link 321 with a crosshead 322 slidably mounted upon vertical guide rods 323 bolted to flanges 324 formed upon the bearing of the shaft. Secured between flanges 325, formed on the crosshead 322, by means of bolts 326, is a plate 327 resting upon a cotter or wedge 328 held in position by a screw 329 having a shoulder or collar 330 fitting a slot 331 therein. In this manner, the bolts 326 being loosened, the plate 327 may be vertically adjusted as desired by the turning of screw 329, thus inserting or withdrawing the cotter or wedge 328. Slot 318 formed in the heavy crank arm 317 is preferably of substantially the form shown so as to provide a return movement of the crosshead of the highest speed with a given angular rate of travel of the pin 312. With a slot of the form shown, the upward movement of the crosshead 322 takes place during a considerable part of the travel of the pin 312 about its axis. Upon the downward movement of the cross head under the influence of crank 320 and link 321 taking place, however, the pin 312, owing to the curved configuration of the slot 318 will throw the crank 317 quickly to its extreme lateral position, thus depressing the cross head at a corresponding rate of speed.

Referring again to Fig. 2 of the drawings, there is shown fixed upon the shaft 70 a heavy cam 332, adapted to co-act with which is a pin 333 upon a crosshead 334, better shown in Figs. 36 and 37. This crosshead, which projects below the upper part of the bed 50 of the machine, straddles the shaft 70 and a guide 335 and has pivotally connected to its upper portion the two adjustable connecting rods 336. As the mechanism connected to and controlled by these rods is identical, that upon one side only will be described. Mounted upon the casting 54 in brackets 337 and 338 is a rock shaft 339 having fixed upon its rear end a crank 340 articulated to connecting rod 336. Adjustably mounted upon the forward end of this rock shaft, the longitudinal movement of which is prevented by an adjustable collar 341, is a double-arm crank 342, between the arms of which is mounted as by trunnions 343, a sleeve 344, passing through which and fixed in position with relation thereto by means of nuts 345 is a curved link 346. Pivotally mounted between the flanges 347 and 348 depending from the casting 54 is a clamping jaw 349 having formed upon its outer surface a pair of ribs 350, between which is pivoted the lower end of link 346. The crosshead 334, positively reciprocated by means of the cam 332, oscillates the rock shafts 339 by means of connecting rods 336 and cranks 340. Cranks 342 are thus caused to swing in unison with the movement of crosshead 334 and, in turn, through links 346, actuate the clamping jaws 349, the range of movement being such as alternately to swing the jaws above their pivots, as shown in Fig. 36 and swing the same downwardly about the horn 146, as shown in Fig. 37.

The operation of the above described bending or forming mechanism is as follows: Assuming the blank to be fed upon horn 146 by the previously described means, the several parts are positioned so as to cause jaws 349 to occupy the position shown in Fig. 36 at this time, and the crossheads 334 to be in a corresponding contracted condition. The jaws are then quickly swung into their closed position by the above described means, thus bending the blank about the horn, which, by means of the properly timed movement of slide 295 is at this time in its retracted position. Jaws 349, by means of their swinging movement, tightly stretch the blank about the contracted horn and cause the oppositely flanged edges to interlock, as shown in Fig. 37 of the drawings. Horn 146 is now expanded by means of slide rod 295, thus causing the edges to interlock one with another. At this stage, the plate 327, which is being slowly forced upwardly, contacts the interlocked edges and clenches the same, by driving them into a groove 351, formed in member 285, with considerable force. Plate 327 is then quickly retracted and the horn being allowed to contract by means of slide rod 295 and the jaws 349 swung upwardly, the feed pawls 150 take against the rear edge of what may now be termed the "cam body" and force the same into the cage 156, as previously described.

By means of the above described mechanism, the blank is smoothly stretched about the horn or mandrel 146, thus assuring that the flanged edges will pass one another and be interlocked by the subsequent expansion of the horn. The blow struck by the plate 327, moreover, is of such force owing to the power exerted by the toggle joint comprising crank 320 and link 321, as to clench the same in an efficient manner and yet the heavy cross head with the associated parts is quickly retracted so as to avoid delay at this point in the formation of the can body. It will be seen that the ready adjustability of the parts, which is a feature of marked value throughout this entire machine, is carried out in the last described mechanism, and that blanks of various sizes may be accommodated, or the wear of the parts readily taken up. After the seam has been clenched as above described, flux is applied thereto, preferably by means of the following simple mechanism: Mounted upon the bed 50 is a furnace 352, best shown in its entirety in Fig. 1 of the drawings. Suitable fire and ash doors 353 and 354 are provided and at each end of the furnace is a flue 355, these flues being connected as by cross flue 356 discharging through the action of a suction fan 357 into the uptake 358. Each flue is provided with a suitable damper 359. The function of this furnace will be hereinafter described more in detail. Bolted to one end of furnace 352 is a bath or basin 360, adapted to contain the flux for the seams of the can bodies. Journaled within the side walls of this basin is a roller 361, the lower portion, which is designed to contact with and apply flux to the seam of the can body as the latter passes thereover. The several can bodies being fed through cage 156 with their seams at their lowermost parts, by reason of their frictional engagement with roller 361, cause the same to transmit flux thereto from the basin 360.

It will thus be seen that I have provided simple and yet efficient means for applying flux to the seams of the can bodies and that the same are at all times readily accessible. Another advantageous feature lies in the fact that a uniform amount of flux is evenly applied to each seam, as, other conditions being equal, the amount taken up by the roller at each revolution is constant.

The next step in the formation of a can body or other article of the general nature of those with which the above-described machine is designed to deal is the application of solder to the seam. In soldering machinery, in general, I have found it to be of prime importance that the pressure of the solder-applying means against the seam be substantially constant and that the amount of solder applied be uniform. In order to fulfil the above conditions with varying conditions of temperature of the parts of the machine, and to render the same adaptable to varying sizes of cans, it is of importance that means be provided for adjusting the position of the solder-applying element. It is also highly desirable that the flux and solder be thoroughly sweated up into the seam if an efficient joint is to result. These advantageous features are prominent in the soldering machinery hereinafter described, which embodies some features of my invention.

Referring now to Fig. 43 of the drawings, there is shown mounted upon the furnace 352 a series of baths or basins 362. These basins are maintained at the desired temperature, either by means of a fire within the furnace or firebox 352 or, as is shown in Fig. 45 of the drawings, by means of gas jets 363, the latter means possessing distinct advantages in the matter of cleanliness and ease of maintenance. Between basins 362 are sweating irons 364, which are likewise maintained in heated condition by means of jets 363. These sweating irons are positioned, as indicated in Fig. 47, of the drawings, so as to contact the adjacent seams of the cans and sweat the solder into the same. If desired, the gas jets may be caused to play directly upon the seams, thus subjecting the same to a more intense heat. In the embodiment shown in Fig. 46 of the drawings, the sweating irons 365 are heated by the fire within the furnace 352, thus doing away with the use of the gas jets above described.

Referring now to Fig. 50 of the drawings, there is shown fixed upon the lower ends of vertical shaft 194 a bevel gear 366 meshing with a similar gear 367 upon a shaft 368 journaled in the arm 369 of a bracket 370. This bracket is adjustably mounted upon standard 51 by means of the bolts 373 rotatably mounted in lug 374. Fixed upon shaft 368 is a sprocket 375 adapted to drive a chain 376 passing over guide sprockets 377, journaled upon studs 378, and 379, upon shaft 380, mounted in a bracket 381, the latter being shown in Fig. 2 of the drawings. Chain 376 passes over and drives sprocket wheels 382 fixed upon inclined shafts 383, the parts associated with each of which being identical, those having to do with one only will be described. As shown in Figs. 47 and 48 of the drawings, shaft 383 is journaled in a bearing 384 pivotally mounted as by trunnions 385 between wings 386 formed upon the bath or receptacle 362. Formed upon the bearing 384 is a lug 387, pivotally secured to which is a supporting rod 388 passing through a perforated lug 389 formed upon bath 362 and adjustably fixed therein by means of nuts 390. An upwardly and outwardly projecting arm 391 is provided with a guide 392 adapted to co-act with the upper surface of the chain. The longitudinal movement of the shaft 383 within the bearing 384 is prevented by means of collars 393 and 394 fixed thereon. At the lower end of the shaft is fixed a roller 395 having a concave surface 396 inclined with respect to the axis of the shaft. This roller is adapted to project downwardly within the bath 362, and the upper surface thereof is so positioned as to be adapted to rest in contact with the seam in the can body. As roller 395 is driven by the chain, a portion of molten solder adheres to the outer surface thereof and is transmitted to the seam. The seams are thus thoroughly sealed and the solder, or equivalent material, sweated up into the same to the desired extent by the series of jets 363. Owing to the action of the succession of solder-applying disks or rollers 395, the solder is applied in successive instalments, this action resulting in a more efficient and otherwise desirable joint. It will thus be seen that the can body, although at all times readily accessible, is surely and yet flexibly guided into such position as to be subjected to the fullest action of the soldering means. The adjustability of the parts, moreover, which is, as above pointed out, a leading feature of this machine, is found also in the soldering mechanism, the effect of expansion of the parts due to heat being compensated for and the wear thereof being taken up by the means above described.

In order to make a finished joint and to attain the desired economy in the use of solder, it is highly desirable that the surface be thoroughly cleansed. In this step, it is found that a brush or other cleansing member is likely to become foul during use and thus fail to properly perform its functions. This defect is remedied and many advantages attained in cleansing mechanism of the following nature: Referring now to Fig. 49, there is shown as fixed upon shaft 368 a rotary brush 397. Journaled within the outer end of arm 369 is a shaft 398, having fixed thereon a sprocket wheel 399 driven from a sprocket 400 upon shaft 368 by means of a chain 401. Also fixed upon shaft 398 is a rotary brush 402 substantially in alinement with brush 397, both of these brushes being so positioned as to lie directly beneath and to engage the seams of the can bodies.

The operation of the above described mechanism should be largely obvious from the drawings and the description given. Brush 397 is driven directly from shaft 368, and brush 402, by means of chain 401, is forced to revolve in the same direction, this direction being such as to drive the upper surfaces of the brushes in the direction contrary to the travel of the can bodies. In this manner, each seam is exposed to the action, first, of brush 402, and then, of brush 397, the former of which removes the larger portion of the solder adhering to the outer surface of the seam, and the latter of which thoroughly cleanses and finishes the joint. Due to this serial action, the brush 402, even though it become fouled in use, will still remove the major portion of the solder adhering to the joint, thus preventing the brush 397 from receiving but a small portion of the same. In this manner, the latter brush is maintained in a relatively clean condition and is well adapted to produce a finished joint.

It will thus be seen that I have provided means which are well adapted thoroughly to cleanse and finish the seam and that these means are simple in construction and positive in action. Moreover, the mechanism above described is readily accessible at all times, as for purposes of repairing or cleansing of the parts and, if necessary, the parts thereof subject to wear may be readily replaced without a material amount of labor or loss of time.

In Fig. 51 of the drawings is shown another embodiment of certain features of my invention differing mainly in the form of cleansing mechanism used and in the means for propelling the can bodies along the supporting cage. Journaled within bracket 404 mounted upon the girder 55 is a vertical shaft 405, the lower end of which is provided with a bearing 406 formed in the bracket 407 secured to support or standard 51. Shaft 405, which is driven from shaft 60 by means of spiral gears 408 and 409, is prevented from moving vertically by means of the collar 410 fixed upon the lower end thereof and resting in contact with the bearing in bracket 407. Journaled in this bracket and a similar member 411, secured to the standard 51 immediately above the same, are shafts 412 and 413, driven by suitable gearing from the vertical shaft 405. Removably secured upon these shafts, as by the screws 414 passing through the hubs thereof, are rotary brushes 415 and 416 of such diameter and so positioned as to be in contact one with another, as at point 417. These brushes being driven in the same angular direction, pass one another in opposite directions at their point of contact 417. The upper brush 415 preferably projects within the path of travel of the can bodies, as shown in the drawing, and is adapted to engage and cleanse the seams of the same as they pass this point propelled by the following means: Slidably mounted upon the frame of the machine is a rod 418 supported at its forward end by a hanger 419 secured to girder 55. Connected with this rod by means of the two-part links 420, the length of each of which is adjustable as by bolts 421 and slots 422, is what may be termed a "feed rod" 423. This rod has fixed thereon a pin 424 adapted, as the rod is moved backwardly and forwardly, alternately to engage inclined guides 425 and 426, thus rocking the shaft within its bearings in links 420. Loosely mounted upon feed rod 423, in properly spaced relation to engage the rear surfaces of the several can bodies, are a series of arms 427, the longitudinal movement of each of which is limited by fixed collars 428 and 429, and the angular position of which is determined, in a large measure, by means of spiral springs 430.

The operation of the above described embodiment is as follows: Assuming the rod 418 to be reciprocated in any desired manner, thus imparting a similar movement to feed rod 423, the latter member is rocked about its axis by the alternative engagement with inclined guides 425 and 426 of pin 424, as above indicated. This rocking movement is so timed as to cause the arms 427 to be swung down into the path of travel of the cans upon reaching the rearward portion of their path of travel. Upon being thrown forwardly, each of these arms engages the rear edge of the corresponding can body and follows it throughout the desired distance, the forward movement being determined largely by the engagement of the pin 424 with inclined guide 425, whereby the arms are thrown upwardly above the can bodies. These arms retain their upper position throughout the larger part of their rearward movement and are finally again rotated to their lower position. This cycle of operations is repeated with each reciprocation of the rod 418. The cleansing brush 415 is driven by shaft 413 in such direction as to move its upper surface in a direction contrary to the travel of the seam which it engages and cleans. This brush is maintained in a comparatively clean condition by means of its constant rubbing engagement with brush 416 at the point 417.

It will be seen that the last described embodiment of certain elements of my invention possesses many meritorious features, among which may be noted the positive character of the feed, and the simple and yet efficient means of preventing the operative cleansing brush from becoming foul.

From the above description, it will be seen that the unitary machine which I have set forth is well adapted to accomplish the objects of my invention. Upon the rigid framework first described are mounted means for receiving raw material in the shape of metal sheets, means for delivering the same in the form of a finished can body, and also means for efficiently and economically accomplishing the several steps in this formation. Each of the several mechanisms, although embodying features of independent value, is nevertheless peculiarly adapted to co-act with that preceding and that following, and each mechanism prepares the article acted upon for the action of the parts next in operation. The feeding mechanisms are adapted to transmit the article from one to another of the several divisions of the machine and in each case are positive in action and adjustable to accommodate blanks of the desired size. This feature of adjustability, as above pointed out, runs through the entire machine and adds materially to the value thereof.

It will thus be seen that I have set forth as embodying my invention a single harmonious machine adapted automatically to form can bodies, or articles of a like general nature, from metallic sheets. Many of the advantageous features of this machine have been above set forth in detail and many will be apparent from the above description. It may be noted in conclusion that the entire machine is of the simplest and most substantial construction and all parts thereof are well adapted to stand the wear and tear of hard practical use.

As many changes could be made in the above construction and many apparently widely different embodiments of my invention could be made without departing from the scope thereof, I intend that all matter contained in the above description or shown in the accompanying drawings shall be interpreted as illustrative and not in a limiting sense. I desire it also to be understood that the language used in the following claims is intended to cover all of the generic and specific features of the invention herein described, and all statements of the scope of the invention, which, as a matter of language, might be said to fall therebetween.

Having described my invention, what I claim as new and desire to secure by Letters Patent is:—

1. In a mechanism of the class described, in combination, a bed, means embracing said bed and provided with members lying at each side thereof, means adapted to reciprocate said first-mentioned means, a series of spaced dogs positioned upon each of said members and spring pressed above the surface of said bed, said dogs being spaced at a distance substantially equal to the throw of said reciprocating means, and magnetic means adapted to co-act with a blank upon said bed, to permit said blank to be fed over said bed by said reciprocating means in a flattened condition.

2. In mechanism of the class described, in combination, a bed, means embracing said bed and provided with members lying at each side thereof, means adapted to reciprocate said first-mentioned means, a series of spaced dogs positioned upon each of said members and spring pressed above the surface of said bed, said dogs being spaced at a distance substantially equal to the throw of said reciprocating means, and magnetic means spaced from said bed and adapted to co-act with a blank lying thereon, to permit said blank to be fed over said bed by said reciprocating means in a flattened condition.

3. In mechanism of the class described, in combination, a bed, magnetic means spaced from said bed and adapted to attract a blank lying thereon toward the bed and hold it in engagement therewith, and means adapted to feed blanks over said bed.

4. In mechanism of the class described, in combination, a bed, magnetic means adapted to attract a blank lying thereon toward the bed and hold it in engagement therewith, and means adapted to feed blanks over said bed.

5. In mechanism of the class described, in combination, a bed, a plurality of magnets the poles of which project through and are magnetically insulated therefrom, and means adapted to feed a blank over said bed within the field of said magnetic means.

6. In mechanism of the class described, in combination, an expansible horn, means within said horn adapted to expand the same, means within said horn adapted to contract the same, and means positioned within and projecting without said horn adapted to eject a body therefrom.

7. In blank feeding mechanism, in combination, a plurality of blank supporting members, means upon one of said members adapted to thrust the lowermost blank laterally, and means adapted to receive and isolate the same, said members being adapted to continuously underlie and support the blanks.

8. In blank feeding mechanism, in combination, a plurality of rotary blank supporting members, means upon said supporting members adapted to thrust the lowermost blank laterally, and means adapted to receive and isolate the same.

9. In blank feeding mechanism, in combination, a plurality of blank supporting members, means upon said members adapted to contact the lowermost blank and thrust the same laterally, and means upon said members adapted to receive and isolate the same.

10. In blank feeding mechanism, in combination, a plurality of blank supporting members, means upon one of said members adapted to thrust the lowermost blank laterally, and means upon another of said members adapted to receive and isolate the same.

11. In blank feeding mechanism, in combination, a plurality of supports simultaneously co-acting with one another to support the blanks, and means whereby portions of each blank are successively released by said supports.

12. In blank feeding mechanism, in combination, a plurality of supporting members, and means whereby the opposite sides of the lowermost blank are successively released by said supports.

13. In blank feeding mechanism, in combination, a plurality of supporting members, means adapted to thrust the lowermost blank in one direction and release the edge upon which said thrust has been exerted, and means adapted to thrust said blank in the opposite direction and release the edge upon which said second-mentioned thrust has been exerted.

14. In blank feeding mechanism, in combination, a plurality of blank supporting members, means upon one of said members adapted to thrust the lowermost blank in one direction and release the edge of the same upon which said thrust has been exerted, and means upon another of said members adapted to thrust said blank in the opposite direction and release the edge upon which said second-mentioned thrust has been exerted.

15. In blank feeding mechanism, in combination, a plurality of blank supporting members, means upon one of said members adapted to thrust the lowermost blank in one direction and release the edge upon which said thrust has been exerted, and means upon another of said members adapted to thrust said blank in the opposite direction and release the edge upon which said second thrust has been exerted.

16. In blank feeding mechanism, in combination, a plurality of blank supporting members, means adapted to thrust the lowermost blank in one direction, means adapted to release the edge upon which said thrust has been exerted, and means upon one of said blank supporting members adapted to thrust said blank in the opposite direction and release the edge upon which said second thrust has been exerted.

17. In blank feeding mechanism, in combination, a plurality of blank supporting members, means upon one of said members adapted to thrust the lowermost blank in one direction and release the edge upon which said thrust has been exerted, another of said members being slotted to receive said blank, and means upon said second-mentioned member adapted to thrust said blank in the opposite direction and release the edge upon which said second thrust has been exerted.

18. In blank feeding mechanism, in combination, a plurality of rotatable blank supporting members, a projection upon the supporting surface of one of said members adapted to contact and thrust laterally the lowermost blank, and a projection upon the supporting surface of another of said blank supporting members adapted to contact said blank and thrust the same laterally in the opposite direction.

19. In blank feeding mechanism, in combination, a plurality of blank supporting members rotatable about parallel axes, a projection upon the supporting surface of one of said blank supporting members adapted to contact and thrust laterally the lowermost blank and subsequently release the same, and a projection upon the supporting surface of another of said members adapted to thrust said blank in the opposite direction and release the edge upon which said second thrust has been exerted.

20. In blank feeding mechanism, in combination, a plurality of pairs of blank supporting members, the members of each pair being rotatable in opposite directions about parallel axes, projections upon the supporting surfaces of one of said pairs of members adapted to contact and thrust laterally the lowermost blank, and projections upon the supporting surfaces of another of said pairs adapted to contact said blank and thrust the same in the opposite direction.

21. In blank feeding mechanism, in combination, a rotatable member having a supporting surface eccentrically disposed about the axis thereof adapted to support one side of a blank, and a similar member adapted to support the other side thereof, said supporting surfaces being so positioned with relation to each other that they will alternately occupy operative positions with respect to the blank.

22. In blank feeding mechanism, in combination, a rotatable member having a supporting surface eccentrically disposed about the axis thereof adapted to support one side of the lowermost blank, and a similar member adapted to support the other side thereof, said supporting surfaces being so positioned with relation to each other that they will alternately occupy operative positions with respect to the blank, and said first-mentioned member having a supporting surface circularly disposed about its axis adapted to support the blanks above the lowermost thereof.

23. In blank feeding mechanism, in combination, four supporting members rotatable about parallel axes, means for rotating the same in pairs in opposite directions, a supporting surface upon each of said members eccentrically disposed with respect to the axis thereof, and a projection upon each supporting surface of a thickness less than that of the blanks to be fed, a pair of said members being slotted or grooved immediately above the supporting surface thereof, said supporting members being so positioned with relation one to another that the projections upon one pair of the same are adapted to contact the lowermost blank with the projection upon the other of said pairs free from contact with the same.

24. In an automatic stop mechanism, in combination, a fixed member, a movable member adjacent thereto, a clutch and means whereby said clutch is thrown out upon the distance between said fixed and movable members exceeding a certain predetermined value.

25. In an automatic stop mechanism, in combination, a fixed member, a movable member adjacent thereto, a clutch and adjustable means whereby said clutch is thrown out upon the distance between said fixed and movable members exceeding a certain predetermined value.

26. In an automatic stop mechanism, in combination, a fixed member, a movable member adjacent thereto, a clutch, an arm operatively connected to said clutch, a connection between said movable member and said arm and power actuated means in the path of travel of which said arm is adapted to move, upon the distance between said fixed and said movable members exceeding a certain predetermined value.

27. In an automatic stop mechanism, in combination, a fixed member, a movable rolling member adjacent thereto, a clutch, an arm operatively connected to said clutch, a connection between said movable rolling member and said arm and power actuated means within the path of travel of which the end of said arm is interposed upon the distance between said movable rolling member and said fixed member exceeding a certain predetermined limit, said clutch being thrown out upon such interposition taking place.

28. In an automatic stop mechanism, in combination, a fixed member, a movable rolling member, a clutch, a pivotally mounted shipping fork connected with said clutch, an arm upon said shipping fork, a connection between said arm and said movable rolling member and power actuated means in the path of travel of which said arm is adapted to be interposed upon the distance between said movable rolling member and said fixed member exceeding a certain predetermined limit, said clutch being thrown out upon such interposition taking place.

29. In an automatic stop mechanism, in combination, a fixed member, a movable member adjacent thereto, a clutch, shipping means connected with said clutch, an arm connected with said shipping means, an adjustable connection between said movable member and said arm and power actuated means in the path of travel of which said arm is adapted to be interposed, upon the distance between said movable member and said fixed member exceeding a certain predetermined limit.

30. In an automatic stop mechanism, in combination, a fixed member, a movable member adjacent thereto, a clutch, shipping means connected with said clutch, an arm connected with said shipping means, an adjustable connection between said movable member and said arm and power actuated means in the path of travel of which said arm is adapted to be interposed, upon the distance between said movable member and said fixed member exceeding a certain predetermined limit, said power actuated means comprising a cam and a pivotally mounted wiper.

31. In an automatic stop mechanism, in combination, a fixed member, a movable rolling member, a clutch, shipping means connected with said clutch, an arm pivotally mounted upon said shipping means, an adjustable connection between said rolling member and said arm, an adjustable weight upon said arm, cam actuated means within the path of travel of which the end of said arm passes upon the distance between said rolling and said fixed members exceeding a certain predetermined limit, said clutch being thrown out upon such interposition taking place and manually actuated means adapted to throw said clutch in either direction.

32. In a feeding mechanism, in combination, a bed, a plurality of spring pressed substantially equally spaced dogs projecting above the surface of the same at each side thereof, a cross-head upon which said dogs are mounted and epicycloidal gearing adapted to impart a reciprocating movement to said cross-head.

33. In a feeding mechanism, in combination, a supporting member provided with a plurality of slots, a rod in each of said slots below the surface of said supporting member provided with a spring pressed dog projecting above said surface and having an inclined face in one direction, a cross-head to which each of said rods is connected and epicycloidal gearing adapted to reciprocate said cross-head.

34. In feeding mechanism, in combination, a guide formed of substantially parallel longitudinal resilient members adapted to support and guide the part to be fed and positioned to surround the same, and a chain passing in proximity to said guide and provided with projections adapted to engage and move the part to be fed.

35. In a guide of the class described, a plurality of substantially parallel resilient members conforming substantially to the contour of the article to be guided.

36. In a guide of the class described, a plurality of substantially parallel resilient members supported at their ends and conforming substantially to the contour of the article to be guided, said members being free from support at points intermediate said end supports.

37. In a guide of the class described, a plurality of substantially parallel members supported at their ends and conforming substantially to the contour of the article to be guided, said members being free to move with respect to each other throughout their length.

38. In feeding mechanism, in combination, a guide composed of resilient members conforming substantially to the contour of the article to be guided, and means adapted to feed articles along said guide.

39. In a guide of the class described, a plurality of substantially parallel wires substantially conforming to the contour of the article to be guided.

40. In a guide of the class described, a plurality of substantially parallel spring stretched wires substantially conforming to the contour of the article to be guided.

41. In a guide of the class described, in combination, a plurality of substantially parallel spring stretched wires substantially conforming to the contour of the article to be guided, and means adapted to adjust the tension of said wires.

42. In a guide of the class described, a plurality of substantially parallel wires substantially conforming to the contour of the article to be guided, a plurality of members to each of which one of said wires is secured, a fixed member in which said first-mentioned members are slidably mounted, adjustable means upon each of said slidable members, and a spring interposed between said fixed member and each of said adjustable means.

43. In feeding mechanism, in combination, a plurality of substantially parallel spring stretched wires substantially conforming to the contour of the article to be fed, a pivotally mounted hook adjacent said wires adapted to engage and draw said article, and means adapted to reciprocate said hook.

44. In feeding mechanism, in combination, a plurality of substantially parallel spring stretched wires substantially conforming to the contour of the article to be fed and adapted to support the same, a plurality of spaced pivotally mounted hooks adjacent said wires and adapted to engage and draw said article, and means adapted to reciprocate said hooks.

45. In feeding mechanism in combination, a plurality of substantially parallel spring stretched wires substantially conforming to the contour of the article to be fed and adapted to surround the same, and a chain mounted adjacent said wires and provided with projections adapted to engage and feed said article.

46. In a guide of the class described, in combination, a plurality of substantially parallel spring stretched wires substantially conforming to the contour of the article to be fed, and a chain mounted adjacent said wires and provided with spaced projections adapted to engage and feed said article.

47. In feeding mechanism, in combination, a plurality of substantially parallel resiliently stretched wires substantially conforming to the contour of the article to be fed and adapted to support the same, a pivotally mounted hook adjacent said wires adapted to engage and draw said article, means for reciprocating said hook, and a chain mounted adjacent said wires and provided with spaced projections adapted to engage and move said article.

48. In feeding mechanism, in combination, a plurality of substantially parallel spring stretched wires substantially conforming to the contour of the article to be fed and adapted to support the same, a plurality of spaced pivotally mounted hooks adapted successively to engage and draw said article, and a chain mounted adjacent said wires and provided with spaced projections adapted to engage and move said article.

49. In feeding mechanism, in combination, a supporting member provided with a slot, a rod in said slot below the surface of said supporting member and provided with means projecting above said surface, a second supporting member adjacent said first-mentioned supporting member and adapted to receive the article to be fed therefrom, means adapted to reciprocate said rod, a pivotally mounted hook adjacent said second-mentioned supporting member adapted to engage and draw the article to be fed, means adapted to reciprocate said hook, and a chain mounted adjacent said second-mentioned supporting member in serial relation to said rod and said hook and provided with projections adapted to engage and propel the article to be fed.

50. In feeding mechanism, in combination, a bed, a horn and a cage adapted successively to support the article to be fed, said cage being formed of a plurality of substantially parallel wires substantially conforming to the contour of the article to be fed, dogs upon each side of said bed and projecting above the surface thereof adapted to engage and feed said article from said bed to said horn, a rod within a slot in said horn below the surface thereof and provided with yielding means projecting above said surface and adapted to feed said article from said horn to said cage, means adapted to reciprocate said dogs and said rod, and means mounted adjacent said cage in serial relation to said rod and said dogs adapted to move said article within the same.

51. In feeding mechanism, in combination, a bed, a horn and a cage adapted successively to support the article to be fed, said cage being formed of a plurality of substantially parallel wires substantially conforming to the contour of the article to be fed, dogs upon each side of said bed and projecting above the surface thereof adapted to engage and feed said article from said bed to said horn, a rod within a slot in said horn below the surface thereof and provided with yielding means projecting above said surface and adapted to feed said article from said horn to said cage, means adapted to reciprocate said dogs and said rod, means mounted adjacent said cage in serial relation to said rod and said dogs adapted to move said article within the same, said means comprising a pivotally mounted hook adapted to engage and draw said article, means adapted to reciprocate said hook, and a chain mounted adjacent said cage provided with a projection adapted to engage and propel said article.

52. In feeding mechanism, in combination, a bed, a horn and a cage adapted successively to support the article to be fed, said cage being formed of a plurality of substantially parallel spring stretched wires substantially conforming to the contour of the article to be fed, dogs upon each side of said bed and projecting above the surface thereof adapted to engage and feed said article from said bed to said horn, a rod within a slot in said horn below the surface thereof and provided with yielding means projecting above said surface and adapted to feed said article from said horn to said cage, means adapted to reciprocate said dogs and said rod, means mounted adjacent said cage in serial relation to said rod and said dogs adapted to move said article within the same, said means comprising a pivotally mounted hook adapted to engage and draw said article, means adapted to reciprocate said hook, and a chain mounted adjacent said cage provided with a projection adapted to engage and propel said article.

53. In an edging mechanism, in combination, means adapted to clamp and hold a blank adjacent the edges thereof, rotary means adapted simultaneously to strike and bend the projecting edges of said blank in opposite directions said rotary means being mounted to rotate continuously, and means adapted to rotate the same.

54. In an edging mechanism, in combination, means adapted to clamp and hold a blank adjacent the opposite edges thereof, and a rotary member mounted adjacent each of said projecting edges and provided with removable blades, said rotary members being adapted to strike and bend the opposite projecting edges of said blank substantially simultaneously and in opposite directions.

55. In combination, a fixed member, a pivotally mounted member tapering to an edge and adapted to swing into a position with one of its faces substantially parallel to the surface of said fixed member and said edge substantially flush with one of the corners thereof, means adapted to swing said pivotally mounted member, said fixed and pivotally mounted members being adapted to clamp a blank between them, and a rotary member adapted to strike the projecting edge of said blank and bend the same in the direction of said pivotally mounted member.

56. In combination, a fixed member tapering to an edge, a pivotally mounted member adapted to swing into a position with one of its faces substantially parallel to a face of said fixed member, and one of its corners substantially flush with said edge thereof, said fixed and pivotally mounted members being adapted to clamp a blank between them, means adapted to swing said pivotally mounted member and a rotary member mounted adjacent said fixed member and adapted to strike the projecting edge of said blank and bend the same in the direction of said fixed member.

57. In combination, a plurality of fixed members each having an exposed face, each of said exposed faces lying substantially within a single plane, a movable member corresponding to each of said fixed members, means adapted simultaneously to move said movable members against said exposed faces of the corresponding fixed members, said fixed and movable members being adapted to clamp a blank between them adjacent the edges thereof, a rotary member mounted adjacent each fixed member and adapted to strike and bend the projecting edge of said blank and means adapted continuously to rotate said rotary member.

58. In combination, a plurality of fixed members each having an exposed face, said exposed faces lying substantially within a single plane, a pivotally mounted member corresponding to each of said fixed members, means adapted to swing said pivotally mounted members simultaneously against said exposed faces of the corresponding fixed members, said fixed and said pivotally mounted members being adapted to clamp a blank adjacent the edges thereof, a rotary member mounted adjacent each of said fixed members and adapted to strike and bend the corresponding projecting edge of said blank and means adapted to rotate continuously said rotary member.

59. In combination, a fixed member, a movable member tapering to an edge and adapted to move into a position with one of its faces substantially parallel to an exposed surface of said fixed member, and said edge substantially flush with one of the corners thereof, a second fixed member tapering to an edge and provided with an exposed surface substantially in the plane of said exposed surface of said first mentioned fixed member, a second movable member adapted to move into a position with one of its faces substantially parallel to the exposed surface of said second fixed member, and one of its corners substantially flush with said edge, said fixed and said movable members being adapted to clamp between them a blank adjacent the edges thereof, means adapted to move said movable members into operative position, a rotary member mounted adjacent said first mentioned fixed member and adapted to strike the corresponding projecting edge of said blank and bend the same in the direction of said movable member, a rotary member mounted adjacent the other of said fixed members and adapted to strike the corresponding edge of said blank and bend the same in the direction of said fixed member and means adapted to rotate continuously said rotary member.

60. In combination, a plurality of fixed members each having an exposed face, said exposed faces being positioned substantially in a single plane, a bracket upon which each of said fixed members is positioned, a member pivotally mounted upon each of said brackets, means adapted to move said pivotally mounted members simultaneously against the exposed faces of the corresponding fixed members and clamp a blank adjacent its edges between said fixed and pivotally mounted members, and a rotary member journaled in each bracket adapted to strike the projecting edge of said blank.

61. In combination, a frame, a bracket adjustably mounted thereon, a fixed member mounted upon said bracket and tapering to an edge, a movable member adapted to move into a position with one of its faces substantially parallel to the surface of said fixed member and one of its corners substantially flush with said edge, a second bracket adjustably mounted upon said frame, a fixed member mounted upon said bracket, a movable member tapering to an edge and adapted to move into a position with one of its faces substantially parallel to the surface of said second fixed member and said edge flush with one of the corners thereof, pivotal connections between each of said movable members and corresponding bracket, said fixed and movable members being adapted to clamp a blank adjacent its edges, a rotary member mounted in each of said brackets adapted to strike the projecting edge of said blank, a driving shaft, and operative connections between said driving shaft and said rotary members.

62. In combination, a frame, a bracket adjustably mounted thereon, a fixed member mounted upon said bracket and tapering to an edge, a movable member adapted to move into a position with one of its faces substantially parallel to the surface of said fixed member and one of its corners substantially flush with said edge, a second bracket adjustably mounted upon said frame, a fixed member mounted upon said bracket, a movable member tapering to an edge and adapted to move into a position with one of its faces substantially parallel to the surface of said second fixed member and said edge flush with one of the corners thereof, pivotal connections between each of said movable members and corresponding bracket, said fixed and movable members being adapted to clamp a blank adjacent its edges, a rotary member mounted in each of said brackets adapted to strike the projecting edge of said blank, a driving shaft, and connecting shafts between said driving shaft and said rotary members, said connections being adapted to permit an angular movement of said last-mentioned shafts with respect to said driving shaft and maintain the same in operative condition.

63. In combination, a frame, a bracket adjustably mounted thereon, a fixed member mounted upon said bracket and tapering to an edge, a movable member adapted to move into a position with one of its faces substantially parallel to the surface of said fixed member and one of its corners substantially flush with said edge, a second bracket adjustably mounted upon said frame, a fixed member mounted upon said bracket, a movable member tapering to an edge and adapted to move into a position with one of its faces substantially parallel to the surface of said second fixed member and said edge flush with one of the corners thereof, pivotal connections between each of said movable members and corresponding bracket, said fixed and movable members being adapted to clamp a blank adjacent its edges, a rotary member mounted in each of said brackets adapted to strike the projecting edge of said blank, a driving shaft, connecting shafts between said driving shaft and said rotary members, said connection being adapted to permit an angular movement of said last-mentioned shafts with respect to said driving shaft and maintain the same in operative condition, and a bed mounted between said fixed members and having its surface substantially in the plane of the lower surfaces thereof.

64. In combination, a plurality of fixed members each having an exposed face, said exposed faces being positioned substantially in a single plane, a bracket upon which each of said fixed members is positioned, a member pivotally mounted upon each of said brackets, a driving shaft, a cam upon said shaft, a cross-head having operative connection with said cam, connections between said cross-head and said pivotally mounted members adapted to force the same against said fixed members and clamp a blank adjacent its edges, a rotary member mounted in each of said brackets and adapted to strike and bend the projecting edges of said blank, and driving connections between said driving shaft and said rotary members.

65. In combination, a frame, a plurality of brackets adjustably mounted thereon, a fixed member upon each of said brackets, each of said fixed members having an exposed surface, said exposed surfaces being substantially in a single plane, a member pivotally mounted upon each of said brackets and adapted to swing into engagement with said exposed surfaces, a driving shaft, a cam upon said shaft, a cross-head operatively engaged by said cam, adjustable links connecting said cross-head and said pivotally mounted members adapted to force the same against said fixed members and clamp a blank adjacent its edges, a rotary-member mounted in each of said brackets adapted to strike and bend the projecting edge of said blank, and driving connections between said driving shaft and each of said rotary members adapted to swing with relation to said driving shaft and maintain operative connection therewith.

66. In a device of the class described, in combination, a horn, a supporting member to which said horn is connected, a fixed member, and a spring interposed between said supporting and said fixed members.

67. In a device of the class described, in combination, a horn, a supporting member to which said horn is connected, fixed members above and below said supporting member, and a spring interposed between said lower fixed member and said supporting member and adapted to hold the same toward said upper fixed member.

68. In a device of the class described, in combination, a horn, a supporting member to which said horn is connected, a fixed member from which said supporting member is loosely suspended, a second fixed member, and a spring interposed between said supporting and said second fixed members.

69. In a device of the class described, in combination, a horn, a supporting member to which said horn is connected, a fixed member from which said supporting member is loosely suspended, a fixed member above said supporting member, a fixed member below said supporting member, and a spring interposed between said supporting member and said last-mentioned fixed member and adapted to hold said supporting member against said second-mentioned fixed member.

70. In a device of the class described, in combination, a horn, a supporting member to which said horn is connected, a fixed member, a flange upon said supporting member, a bolt passing through said flange and into said fixed member and having a shoulder adapted to engage said fixed member, a second fixed member below said supporting member, and a spring interposed between said supporting member and said last-mentioned fixed member 71. In a device of the class described, in combination, a horn comprising two complementary members, a bolt fixed in one of said members projecting into the other thereof, a spring interposed between the head of said bolt and said last-mentioned complementary member, a part upon said first-mentioned complementary member provided with an inclined surface, a wedge-shaped member interposed between said complementary members engaging said inclined surface, and means adapted to slide said wedge-shaped member with reference to said complementary members and expand said horn against the force of said spring.

72. In a device of the class described, in combination, a horn comprising two complementary members, a plurality of bolts fixed in one of said members projecting through and having their heads positioned in recesses in the other of said members, springs interposed between the heads of said bolts and the corresponding portions of said last-mentioned member, parts fixed upon one of said complementary members having inclined surfaces, a rod slidably mounted between said complementary members and having wedge-shaped parts engaging said inclined surfaces, and means adapted to slide said rod with reference to said complementary members and expand said horn against the force of said springs.

73. In a device of the class described, in combination, a horn comprising two complementary members, a supporting member upon which one of said complementary members is mounted, a fixed member having a loose connection with said supporting member, a second fixed member below said supporting member, a spring interposed between said supporting member and said second fixed member, and means slidably mounted upon said supporting member projecting between said complementary members and adapted to expand said horn.

74. In a device of the class described, in combination, a horn comprising two complementary members, a supporting member upon which one of said complementary members is mounted, a rigid member with which said supporting member is connected, a fixed member below said supporting member, a spring interposed between said fixed member and said supporting member, an inclined surface upon one of said complementary members, a wedge-shaped member slidably mounted between said complementary members and engaging said inclined surface, and means adapted to slide said wedge-shaped member and expand said horn.

75. In a device of the class described, in combination, a horn comprising two complementary members, a bolt fixed in one of said complementary members and passing through the other and having its head positioned in a recess therein, a spring interposed between the head of said bolt and the adjacent portions of said last-mentioned complementary member, a supporting member upon which said last-mentioned complementary member is mounted, a rigid member with which said supporting member is connected, a second rigid member below said supporting member, a spring interposed between said supporting member and said last-mentioned rigid member, a part having an inclined surface fixed upon one of said complementary members, a wedge-shaped member interposed between said complementary members engaging said inclined surface, and means adapted to slide said wedge-shaped member and expand said horn against the force of said first spring.

76. In a device of the class described, in combination, a horn comprising two complementary members, a bolt fixed in one of said complementary members and passing through the other and having its head positioned in a recess therein, a spring interposed between the head of said bolt and the adjacent portions of said last-mentioned complementary member, a supporting member upon which said last-mentiond complementary member is mounted, a rigid member with which said supporting member is connected, a second rigid member below said supporting member, a spring interposed between said supporting member and said last-mentioned rigid member, a part having an inclined surface fixed upon one of said complementary members, a wedge-shaped member interposed between said complementary members engaging said inclined surface, and means adapted to slide said wedge-shaped member and expand said horn against the force of said first spring, said means comprising a rod slidably mounted upon said supporting member and a cam to which said rod is connected.

77. In combination, a horn, a pair of jaws pivoted adjacent thereto and shaped to fit the same, and adjustable means adapted simultaneously to close said jaws about said horn.

78. In combination, a horn, a member adapted to be forced against said horn, and means adapted to force the same against said horn at a predetermined speed and return the same at a higher rate of speed.

79. In combination, a horn, an adjustable member adapted to be forced against said horn, and means adapted to force the same against said horn at a predetermined rate of speed and return the same at a higher rate of speed.

80. In combination, a horn, a member adapted to be forced against said horn, a cross-head in which said member is mounted, a crank, a link between said crank and said cross-head, and means adapted to rock said crank.

81. In combination, a horn, a member adapted to be forced against said horn, a cross-head in which said member is mounted, a crank, a link between said crank and said cross-head, a rock shaft upon which said crank is fixed, a slotted arm upon said rock shaft, a crank disk, and a pin in said crank disk fitting said slot and adapted to rock said rock shaft.

82. In combination, a horn, a member adapted to be forced against said horn, a cross-head in which said member is mounted, a crank, a link between said crank and said cross-head, a rock shaft upon which said crank is fixed, a slotted arm upon said rock shaft, a crank disk, and a pin in said crank disk fitting said slot and adapted to rock said rock shaft, said crank disk being positioned upon the side of said rock shaft remote from said horn.

83. In combination, a horn, a member adapted to be forced against said horn, a cross-head in which said member is mounted, a rock shaft, a crank upon said rock shaft, a link connecting said crank and said cross-head, an arm fixed upon said rock shaft provided with a curved slot, a crank disk, and a pin in said crank disk fitting said slot and adapted to rock said rock shaft.

84. In combination, a horn, a member adapted to be forced against said horn, a cross-head in which said member is mounted, a rock shaft, a crank upon said rock shaft, a link connecting said crank and said cross-head, an arm fixed upon said rock shaft provided with a curved slot, a crank disk, and a pin in said crank disk fitting said slot and adapted to rock said rock shaft, said crank disk being upon the side of said rock shaft remote from said horn.

85. In combination, a horn, a member adapted to be forced against said horn, guides, a cross-head slidably mounted upon said guides in which said member is adjustably mounted, a rock shaft, a crank fixed upon said rock shaft, a link connecting said crank with said cross-head, an arm fixed upon said rock shaft and provided with a curved slot, a crank disk having thereon an adjustable pin fitting the said slot and adapted to rock said rock shaft, said crank disk being upon the side of said rock shaft remote from said horn.

86. In combination, a horn, a pair of jaws pivoted adjacent thereto, a rock shaft corresponding to each of said jaws, a crank upon each of said rock shafts, connections between each of said cranks and the corresponding jaw, means adapted to rock said rock shafts simultaneously, a member adapted to be forced against said horn, and means adapted to force the same against said horn at a predetermined rate of speed and return the same at a higher rate of speed.

87. In combination, a horn, a pair of jaws pivoted adjacent thereto, a rock shaft corresponding to each of said jaws, cranks upon said rock shafts, a connection between each of said cranks and the corresponding jaw, means adapted to rock said rock shafts simultaneously, a member adapted to be forced against said horn, a cross-head in which said member is mounted, a third rock shaft having a crank fixed thereon, a link connecting said last-mentioned crank with said cross-head, and means adapted to rock said last-mentioned rock shaft.

88. In combination, a horn, a pair of jaws pivoted adjacent thereto, means adapted simultaneously to close said jaws about said horn, a cross-head, a member adjustably mounted in said cross-head adapted to be forced against said horn, a third rock shaft, a crank fixed thereon, a link connecting said crank and said cross-head, a slotted arm upon said last-mentioned rock shaft, a crank disk, and a pin upon said crank disk fitting the slot in said slotted arm and adapted to rock the same.

89. In combination, a horn, a pair of jaws pivoted adjacent thereto, means adapted simultaneously to close said jaws about said horn, a cross-head, a member positioned within said cross-head adapted to be forced thereby against said horn, a rock shaft, a crank fixed upon said rock shaft, a link connecting said crank with said cross-head, an arm fixed upon said rock shaft having a curved slot therein, a crank disk, and a pin upon said crank disk engaging the slot in said slotted arm and adapted to rock the same.

90. In combination, a horn, a pair of jaws pivoted adjacent thereto, a rock shaft corresponding to each of said jaws, a crank upon each of said rock shafts, connections between each of said cranks and the corresponding jaw, a second crank upon each of said rock shafts, a driving shaft, a cam upon said driving shaft, a cross-head operatively engaged by said cam, links connecting said cross-head with said second-mentioned cranks, a second cross-head, a member mounted in said second cross-head adapted to be forced thereby against said horn, a third rock shaft, a crank fixed upon said rock shaft, a link connecting said crank with said second cross-head, an arm upon said last-mentioned rock shaft having a slot therein, a crank disk upon said driving shaft, and a pin upon said crank disk fitting said slot and adapted to rock said slotted arm.

91. In combination, a horn, a pair of jaws pivoted adjacent thereto, a rock shaft corresponding to each of said jaws, a crank upon each of said rock shafts, connections between each of said cranks and the corresponding jaw, a second crank upon each of said rock shafts, a driving shaft, a cam upon said driving shaft, a cross-head operatively engaged by said cam, links connecting said cross-head with said second-mentioned cranks, a second cross-head, a member mounted in said second cross-head adapted to be forced thereby against said horn, a third rock shaft, a crank fixed upon said rock shaft, a link connecting said crank with said second cross-head, an arm upon said last-mentioned rock shaft having a curved slot therein, a crank disk upon said driving shaft, and a pin upon said crank disk fitting said slot and adapted to rock said slotted arm.

92. In combination, a receptacle, an inclined shaft journaled adjacent said receptacle, a circular member on said shaft within said receptacle having its surface beveled with respect to its axis, and means adapted to pass a can by said receptacle in contact with said circular member.

93. In combination, a receptacle, a shaft journaled in a pivotally mounted bearing adjacent said receptacle, means adapted to adjust the inclination of said shaft, a circular member upon said shaft within said receptacle having its surface beveled with respect to its axis, and means adapted to pass a can by said receptacle in contact with said circular member.

94. In combination, a receptacle, a shaft journaled in a pivotally mounted bearing adjacent said receptacle, means adapted to adjust the inclination of said shaft, a circular member upon said shaft within said receptacle having its surface beveled with respect to its axis, and means adapted to pass a can by said receptacle in contact with said circular member, said shaft being provided with means whereby a rotary movement can be imparted thereto.

95. In combination, a receptacle, means adapted to apply heat thereto, a shaft journaled in pivotally mounted bearings adjacent said receptacle, means adapted to adjust the inclination of said shaft, a circular member upon said shaft within said receptacle and having its surface beveled with respect to its axis, and means adapted to pass a can by said receptacle in contact with said circular member.

96. In combination, a receptacle, means adapted to apply heat thereto, a shaft journaled in bearings pivotally mounted adjacent said receptacle, means whereby the inclination of said shaft can be adjusted, a roller upon said shaft having its surface beveled with respect to its axis and having its lower portion within said receptacle, means adapted to rotate said shaft, and means adapted to pass a series of cans over said roller and in contact therewith.

97. In combination, a plurality of receptacles, a roller journaled in one of said receptacles, a shaft journaled adjacent another thereof and having fixed thereon a circular member within the corresponding receptacle, means adapted to rotate said shaft, and means adapted to pass a can successively over said receptacles and in contact with said roller and said circular member.

98. In combination, a plurality of receptacles, a roller journaled in one of said receptacles, a shaft journaled adjacent another thereof and having fixed thereon a circular member within the corresponding receptacle, means adapted to rotate said shaft, and means adapted to pass a can successively over said receptacles and in contact with said roller and said circular member, said shaft being journaled in adjustable pivotally mounted bearings.

99. In combination, a receptacle, a shaft journaled adjacent thereto, a circular member on said shaft within said receptacle, a series of gas jets, and means adapted to pass said can by said receptacle and in contact with said circular member and over said gas jets with a seam of said can adjacent the flame thereof.

100. In combination, a receptacle, a shaft journaled in pivotally mounted bearings adjacent said receptacle, a circular member on said shaft within said receptacle, a series of gas jets adjacent said receptacle, and means adapted to pass a can over said receptacle and said gas jets with a seam thereof in contact with said circular member and adjacent the flame of said jets.

101. In combination, a receptacle, an inclined shaft journaled in pivotally mounted bearings adjacent said receptacle, means adapted to adjust the inclination of said shaft, a circular member upon said shaft within said receptacle having its surface beveled with respect to its axis, a series of gas jets, and means adapted to pass a can by said receptacle and said gas jets with a seam thereof in contact with said circular member and adjacent the flame of said jets.

102. In combination, a plurality of receptacles, a roller journaled in one of said receptacles, a shaft mounted adjacent another of said receptacles, said shaft being journaled in pivotally mounted bearings, a circular member upon said shaft within the corresponding receptacle having its surface beveled with respect to its axis, a series of gas jets, and means adapted to pass a can by said receptacles and gas jets in series with a seam thereof in contact with said roller and said circular member and adjacent the flame of said jets.

103. In combination, a plurality of blank supporting members, means adapted to thrust the lowermost blank laterally, means adapted to receive and isolate the same, a bed adapted to receive said blank from said isolating means, a movable member adjacent thereto, a clutch, and means whereby said clutch is thrown out upon the distance between said bed and said movable member exceeding a certain predetermined value.

104. In blank feeding mechanism, in combination, a plurality of supports, means whereby each blank is successively released by said supports, a bed adapted to receive one of said blanks from said supports, a movable member adjacent thereto, a clutch, and means whereby said clutch is thrown out upon the distance between said bed and said movable member exceeding a certain predetermined value.

105. In blank feeding mechanism, a plurality of supports, means whereby the lowermost blank is thrust in one direction and dropped by one of said supports, means whereby said blank is thrust in another direction and dropped by the other of said supports, a bed adapted to receive said blank from said supports, a movable member adjacent thereto, a clutch, and means whereby said clutch is thrown out upon the distance between said bed and said movable member exceeding a certain predetermined value.

106. In mechanism of the class described, in combination, a plurality of blank supporting members, means adapted to thrust the lowermost blank laterally, means adapted to receive and isolate the same, a bed adapted to receive said blank from said isolating means, a dog at each side of said bed adapted to project above the surface of the same, and means adapted to impart a reciprocating motion to said dogs.

107. In combination, a plurality of blank supporting members, means adapted to thrust the lowermost blank laterally, means adapted to receive and isolate the same, a bed adapted to receive said blank from said isolating means, and magnetic means mounted adjacent said bed adapted to attract said blank.

108. In blank feeding mechanism, in combination, a plurality of supporting members, means whereby each blank is successively released by said supports, a bed adapted to receive said blanks from said supports, and magnetic means mounted adjacent said bed adapted to attract a blank positioned thereon.

109. In combination, a plurality of blank supporting members, means adapted to thrust the lowermost blank laterally, means adapted to receive and isolate the same, a bed adapted to receive said blank from said isolating means, and magnetic means, positioned at a plurality of points transversely disposed with relation to said bed, adapted to attract a blank positioned thereon.

110. In combination, a bed, a dog adapted to project above the surface of the said bed at each side thereof, means adapted to impart a reciprocating motion to said dogs, a movable member mounted adjacent said bed, said dogs being adapted to propel a blank along said bed beneath said movable member, a clutch, and means whereby said clutch is thrown out upon the distance between said bed and said movable member exceeding a certain predetermined value.

111. In combination, a bed, magnetic means positioned adjacent said bed adapted to attract a blank lying thereon, a movable member mounted adjacent said bed, a clutch, and means whereby said clutch is thrown out upon the distance between said bed and said movable member exceeding a certain predetermined value.

112. In combination, a bed, magnetic means positioned adjacent said bed adapted to attract a blank lying thereon, a movable member mounted adjacent said bed, a clutch, and means whereby said clutch is thrown out upon the distance between said bed and said movable member exceeding a certain predetermined value, said magnetic means being positioned at a plurality of points transversely disposed with relation to said bed.

113. In feeding mechanism, in combination, a bed, magnetic means mounted adjacent said bed and adapted to attract a blank lying thereon, a dog adapted to project above the surface of said bed at each side thereof, and means adapted to impart a reciprocating motion to said dogs.

114. In feeding mechanism, in combination, a bed, magnetic means mounted adjacent said bed and adapted to attract a blank lying thereon, a spring-pressed dog at each side of said bed adapted to project above the surface thereof, said dogs having an inclined surface upon one side and a substantially square surface upon the opposite side, and means adapted to impart a reciprocating motion to said dogs.

115. In combination, supporting means, a movable chain provided with spaced projections mounted adjacent said supporting means and adapted to propel a can body supported thereby, a receptacle, a shaft journaled adjacent said receptacle, and a circular member upon said shaft within said receptacle adapted to contact said can body during its passage upon said supporting means, said shaft being inclined and said circular member having its engaging surface beveled with respect to the axis thereof.

116. In combination, a plurality of blank supporting members, means adapted to thrust the lowermost blank laterally, means adapted to receive and isolate the same, a bed adapted to receive said blank from said isolating means, a movable member adjacent thereto, a clutch, means whereby said clutch is thrown out upon the distance between said bed and said movable member exceeding a certain predetermined value, a dog at each side of said bed adapted to project above the same and means adapted to impart a reciprocating movement to said dogs and move said blank beneath said movable member.

117. In blank feeding mechanism, in combination, a plurality of supports, means whereby each blank is successively released by said supports, a bed adapted to receive one of said blanks from said supports, a movable member adjacent thereto, a clutch, means whereby said clutch is thrust out upon the distance between said bed and said movable member exceeding a certain predetermined value, a dog at each side of said bed adapted to project above the surface thereof, and means adapted to impart a reciprocating movement to said dogs and to move said blank thereby beneath said movable member.

118. In combination, a plurality of blank supporting members, means adapted to thrust the lowermost blank laterally, means adapted to receive and isolate the same, a bed adapted to receive said blank from said isolating means, magnetic means positioned adjacent said bed adapted to attract a blank lying thereon, a movable member adjacent said bed, a clutch and means whereby said clutch is thrust out upon the distance between said bed and said movable member exceeding a certain predetermined value.

119. In mechanism of the class described, in combination, a plurality of blank supporting members, means adapted to thrust the lowermost blank laterally, means adapted to receive and isolate the same, a bed adapted to receive said blank from said isolating means, magnetic means adjacent said bed and adapted to attract a blank lying thereon, a dog at each side of said bed adapted to project above the surface of the same and means adapted to impart a reciprocating motion to said dogs.

120. In combination, a bed, a dog adapted to project above the surface of said bed at each side thereof, means adapted to impart a reciprocating movement to said dogs, a movable member mounted adjacent said bed, said dogs being adapted to propel a blank along said bed beneath said movable member, a clutch, means whereby said clutch is thrown out upon the distance between said bed and said movable member exceeding a certain predetermined value, means adapted to clamp and hold a blank, and rotary members adapted to strike and bend the projecting edges of said blank, said dogs being adapted to move said blank within the range of said clamping means.

121. In combination, a bed, magnetic means positioned adjacent said bed adapted to attract a blank lying upon the same, a dog at each side of said bed adapted to project above the surface thereof, means adapted to impart a reciprocating motion to said dogs, a movable member mounted adjacent said bed, said dogs being adapted to propel a blank along said bed beneath said movable member, a clutch, and means whereby said clutch is thrown out upon the distance between said bed and said movable member exceeding a certain predetermined value.

122. In combination, a bed, a movable member mounted adjacent said bed, a clutch, means whereby said clutch is thrown out upon the distance between said bed and said movable member exceeding a certain predetermined value, a horn, a pair of jaws pivoted adjacent thereto, means adapted to close said jaws about the same, means positioned at each side of said bed and adapted to project above the same, and means for imparting a reciprocating motion to said last-mentioned means, said last-mentioned means being adapted to propel a blank along said bed beneath said movable member and upon said horn.

123. In combination, a supporting bed, magnetic means mounted adjacent thereto and adapted to attract a blank lying thereon, means adapted to clamp and hold said blank, a dog at each side of said bed adapted to project above the surface thereof, means adapted to impart a reciprocating movement to said dogs, said dogs being adapted to propel a blank within the range of action of said clamping means and a member traveling substantially in the arc of the circle adapted to strike and bend a projecting edge of said blank.

124. In combination, a plurality of blank supporting members, means adapted to thrust the lowermost blank laterally, means adapted to receive and isolate the same, a bed adapted to receive said blank from said isolating means, a movable member adjacent thereto, a clutch, means whereby said clutch is thrown out upon the distance between said bed and said movable member exceeding a certain predetermined value, means adapted to clamp and hold said blank, rotary means adapted to strike and bend the oppositely projecting edges of said blank in opposite directions, a dog at each side of said bed adapted to project above the same, and means adapted to impart a reciprocating movement to said dogs and move said blank beneath said movable member and within the range of action of said clamping means.

125. In combination, a bed, a movable member mounted adjacent said bed, a clutch, means whereby said clutch is thrown out upon the distance between said bed and said movable member exceeding a certain predetermined value, means adapted to clamp and hold a blank, rotary members adapted to strike and bend the oppositely projecting edges of said blank in opposite directions, a horn, a pair of jaws pivoted adjacent thereto, means adapted to close said jaws about said horn, and means, at each side of said bed and adapted to project above the same, adapted upon being reciprocated to move a blank along said bed beneath said movable member within the range of action of said clamping means and upon said horn successively.

126. In combination, a bed, a dog adapted to project above the surface of said bed at each side thereof, means adapted to impart a reciprocating movement to said dogs, magnetic means mounted adjacent said bed and adapted to attract a blank lying thereon, a movable member mounted adjacent said bed, said dogs being adapted to propel a blank along said bed beneath said movable member, a clutch, means whereby said clutch is thrown out upon the distance between said bed and said movable member exceeding a certain predetermined value, means adapted to clamp and hold a blank, and rotary means adapted to strike and bend the oppositely projecting edges of said blank, said dogs being adapted to move said blank within the range of said clamping means.

127. In combination, a bed, magnetic means mounted adjacent said bed adapted to attract a member lying thereon, a movable member mounted adjacent said bed, a clutch, means whereby said clutch is thrown out upon the distance between said bed and said movable member exceeding a certain predetermined value, a horn, a pair of jaws pivoted adjacent thereto, means adapted to close said jaws about the same, means positioned at each side of said bed and adapted to project above the same, and means for imparting a reciprocating motion to said last-mentioned means, said last-mentioned means being adapted to propel a blank along said bed beneath said movable member and upon said horn.

128. In combination, a bed, a movable member mounted adjacent said bed, a clutch, means whereby said clutch is thrown out upon the distance between said bed and said movable member exceeding a certain predetermined value, a horn, a pair of jaws pivoted adjacent thereto, means adapted to close said jaws about the same, means positioned at each side of said bed adapted to project above the same, means for imparting a reciprocating motion to said last-mentioned means, said last-mentioned means being adapted to propel a blank along said bed beneath said movable member and upon said horn, a receptacle, a shaft journaled adjacent said receptacle, a circular member upon said shaft within said receptacle, supporting means, means adapted to move said blank from said horn upon said supporting means, and means adapted to propel the same along said supporting means and into and out of contact with said circular member.

129. In combination, a bed, a movable member mounted adjacent said bed, a clutch, means whereby said clutch is thrown out upon the distance between said bed and said movable member exceeding a certain predetermined value, a horn comprising a plurality of parts, means adapted to expand said horn, a pair of jaws pivoted adjacent thereto, means adapted to close said jaws about the same, means positioned at each side of said bed and adapted to project above the same, and means for imparting a reciprocating motion to said last-mentioned means, said last-mentioned means being adapted to propel a blank along said bed beneath said movable member and upon said horn.

130. In combination, a horn comprising a plurality of parts, means adapted to expand said horn, a pair of jaws pivoted adjacent said horn, means adapted to close said jaws previous to the action of said expanding means, a receptacle, a shaft journaled adjacent said receptacle, a circular member upon said shaft within said receptacle, supporting means, means adapted to move an article from said horn upon said supporting means, and means adapted to propel said article along said supporting means into and out of contact with said circular member.

131. In combination, a bed, a dog adapted to project above the surface of said bed at each side thereof, means adapted to impart a reciprocating movement to said dogs, a movable member mounted adjacent said bed, said dogs being adapted to propel a blank along said bed beneath said movable member, a clutch, means whereby said clutch is thrown out upon the distance between said bed and said movable member exceeding a certain predetermined value, means adapted to clamp and hold a blank, rotary members adapted to strike and bend the projecting edges of said blank, a horn comprising a plurality of parts, means adapted to expand said horn, a pair of jaws pivotally mounted adjacent said horn, and means adapted to close the same about said horn, said dogs being adapted to move said blank into and out of the range of said clamping means and upon said horn.

132. In combination, a bed, a dog adapted to project above the surface of said bed at each side thereof, means adapted to impart a reciprocating movement to said dogs, a movable member mounted adjacent said bed, such dogs being adapted to propel a blank along said bed under said movable member, a clutch, means whereby said clutch is thrown out upon the distance between said bed and said movable member exceeding a certain predetermined value, magnetic means mounted adjacent said bed adapted to attract a blank lying thereon, means adapted to clamp and hold a blank, rotary members adapted to strike and bend the oppositely projecting edges of said blank, a horn, jaws pivoted adjacent said horn, and means adapted to close said jaws about said horn, said dogs being adapted to move said blank into and out of the range of action of said clamping means and upon said horn.

133. In combination, a bed, a movable member mounted adjacent said bed, a clutch, means whereby said clutch is thrown out upon the distance between said bed and said movable member exceeding a certain predetermined value, means adapted to clamp and hold a blank, rotary members adapted to strike and bend the oppositely projecting edges of said blank in opposite directions, a horn, a pair of jaws pivoted adjacent thereto, means adapted to close said jaws about said horn, means at each side of said bed adapted to project above the same adapted upon being reciprocated to move a blank along said bed beneath said movable member, within the range of action of said clamping means and upon said horn successively, a receptacle, a shaft journaled adjacent said receptacle, a circular member on said shaft within said receptacle, supporting means, means adapted to feed said blank from said horn to said supporting means, and means adapted to propel said blank along said supporting means into and out of engagement with said circular member.

134. In combination, a bed, magnetic means mounted adjacent said bed adapted to attract a member lying thereon, a movable member mounted adjacent said bed, a clutch, means whereby said clutch is thrown out upon the distance between said bed and said movable member exceeding a certain predetermined value, a horn, a pair of jaws pivoted adjacent thereto, means adapted to close said jaws about the same, means positioned at each side of said bed and adapted to project above the same, means for imparting a reciprocating motion to said last-mentioned means, said last-mentioned means being adapted to propel a blank along said bed beneath said movable member and upon said horn, a receptacle, a shaft journaled adjacent said receptacle, a circular member upon said shaft within said receptacle, supporting means, means adapted to move said blank from said horn upon said supporting means, and means adapted to propel said blank along said supporting means into and out of engagement with said circular member.

135. In combination, a bed, a movable member mounted adjacent said bed, a clutch, means whereby said clutch is thrown out upon the distance between said bed and said movable member exceeding a certain predetermined value, a horn, a pair of jaws pivoted adjacent thereto, means adapted to close said jaws about the same, means positioned at each side of said bed adapted to project above the same, means for imparting a reciprocating motion to said last-mentioned means, said first mentioned means being adapted to propel a blank along said bed beneath said movable member and upon said horn, a receptacle, a shaft journaled adjacent said receptacle, a circular member upon said shaft within said receptacle, supporting means, means adapted to move said blank from said horn upon said supporting means, means adapted to propel the same along said supporting means and into and out of contact with said circular member, a cleansing wheel, and means adapted to rotate the same, said cleansing wheel projecting within the path of travel of said blank beyond its position of contact with said circular member.

136. In combination, a bed, magnetic means mounted adjacent said bed adapted to attract a blank lying thereon, a movable member mounted adjacent said bed, a clutch, means whereby said clutch is thrown out upon the distance between said bed and said movable member exceeding a certain predetermined value, a horn comprising a plurality of parts, means adapted to expand said horn, a pair of jaws pivoted adjacent thereto, means adapted to close said jaws about the same, means positioned at each side of said bed and adapted to project above the same, and means for imparting a reciprocating motion to said last-mentioned means, said last-mentioned means being adapted to propel a blank along said bed beneath said movable member and upon said horn.

137. In combination, a bed, a movable member mounted adjacent said bed, a clutch, means whereby said clutch is thrown out upon the distance between said bed and said movable member exceeding a certain predetermined value, a horn comprising a plurality of parts, means adapted to expand said horn, a pair of jaws pivoted adjacent thereto, means adapted to close said jaws about the same, means positioned at each side of said bed and adapted to project above the same, means for imparting a reciprocating motion to said last-mentioned means, said last-mentioned means being adapted to propel a blank along said bed beneath said movable member and upon said horn, a receptacle, a shaft journaled adjacent said receptacle, a circular member upon said shaft within said receptacle, supporting means, means adapted to move said blank from said horn upon said supporting means, and means adapted to propel said blank along said supporting means into and out of contact with said circular member.

138. In combination, a horn comprising a plurality of parts, means adapted to expand said horn, a pair of jaws pivoted adjacent said horn, means adapted to close said jaws previous to the action of said expanding means, a receptacle, a shaft journaled adjacent said receptacle, a circular member upon said shaft within said receptacle, supporting means, means adapted to move an article from said horn upon said supporting means, means adapted to propel said article along said supporting means into and out of contact with said circular member, a cleansing wheel and means adapted to rotate the same, said cleansing wheel projecting within the path of travel of said blank at a point beyond its position of engagement with said circular member.

139. In combination, a bed, a movable member mounted adjacent said bed, a clutch, means whereby said clutch is thrown out upon the distance between said bed and said movable member exceeding a certain predetermined value, means adapted to clamp and hold a blank, rotary members adapted to strike and bend the oppositely projecting edges of said blank in opposite directions, a horn comprising a plurality of parts, means adapted to separate said parts and expand said horn, a pair of jaws pivoted adjacent thereto, means adapted to close said jaws about said horn, means at each side of said bed and adapted to project above the same, adapted upon being reciprocated to move a blank along said bed beneath said movable member within the range of action of said clamping means and upon said horn successively, a receptacle, a shaft journaled adjacent said receptacle, a circular member within said receptacle, supporting means, means adapted to move said blank from said horn upon said supporting means, and means adapted to propel said blank along said supporting means into and out of contact with said circular member.

140. In combination, a bed, magnetic means mounted adjacent said bed and adapted to attract a blank lying thereon, a movable member mounted adjacent said bed, a clutch, means whereby said clutch is thrown out upon the distance between said bed and said movable member exceeding a certain predetermined value, means adapted to clamp and hold a blank, rotary members adapted to strike and bend the oppositely projecting edges of said blank in opposite directions, a horn, a pair of jaws pivoted adjacent thereto, means adapted to close said jaws about said horn, means, at each side of said bed and adapted to project above the same, adapted upon being reciprocated to move a blank along said bed beneath said movable member within the range of action of said clamping means and upon said horn successively, a receptacle, a shaft journaled adjacent said receptacle, a circular member upon said shaft within said receptacle, supporting means, means adapted to move said blank from said horn upon said supporting means, and means adapted to propel said blank along said supporting means into and out of engagement with said circular member.

141. In combination, a bed, a movable member mounted adjacent said bed, a clutch, means whereby said clutch is thrown out upon the distance between said bed and said movable member exceeding a certain predetermined value, means adapted to clamp and hold a blank, rotary members adapted to strike and bend the oppositely projecting edges of said blank in opposite directions, a horn, a pair of jaws pivoted adjacent thereto, means adapted to close said jaws about said horn, means at each side of said bed and adapted to project above the same adapted upon being reciprocated to move a blank along said bed beneath said movable member within the range of action of said clamping means and upon said horn successively, a receptacle, a shaft journaled adjacent said receptacle, a circular member upon said shaft within said receptacle, supporting means, a cleansing wheel means adapted to drive said cleansing wheel, means adapted to move said blank from said horn upon said supporting means, and means adapted to propel said blank along said supporting means and into engagement with said circular member and said cleansing wheel successively.

142. In combination, a bed, magnetic means mounted adjacent said bed adapted to attract a member lying thereon, a movable member mounted adjacent said bed, a clutch, means whereby said clutch is thrown out upon the distance between said bed and said movable member exceeding a certain predetermined value, a horn, a pair of jaws pivoted adjacent thereto, means adapted to close said jaws about the same, means positioned at each side of said bed and adapted to project above the same, means for imparting a reciprocating motion to said last-mentioned means, said last-mentioned means being adapted to propel a blank along said bed beneath said movable member and upon said horn, a receptacle, a shaft journaled adjacent said receptacle, a circular member upon said shaft within said receptacle, supporting means, a cleansing wheel mounted adjacent said supporting means, means adapted to drive said cleansing wheel, means adapted to move said blank from said horn upon said supporting means, and means adapted to propel said blank along said supporting means and into engagement with said circular member and said cleansing wheel successively.

143. In combination, a bed, magnetic means mounted adjacent said bed adapted to attract a blank lying thereon, a movable member mounted adjacent said bed, a clutch, means whereby said clutch is thrown out upon the distance between said bed and said movable member exceeding a certain predetermined value, a horn comprising a plurality of parts, means adapted to expand said horn, a pair of jaws pivoted adjacent thereto, means adapted to close said jaws about the same, means positioned at each side of said bed and adapted to project above the same, means for imparting a reciprocating motion to said last-mentioned means, said last-mentioned means being adapted to propel a blank along said bed beneath said movable member and upon said horn, a receptacle, a shaft journaled adjacent said receptacle, a circular member within said receptacle upon said shaft, supporting means, means adapted to move a blank from said horn upon said supporting means, and means adapted to propel said blank along said supporting means into and out of engagement with said circular member.

144. In combination, a bed, a movable member mounted adjacent said bed, a clutch, means whereby said clutch is thrown out upon the distance between said bed and said movable member exceeding a certain predetermined value, a horn comprising a plurality of parts, means adapted to expand said horn, a pair of jaws pivoted adjacent thereto, means adapted to close said jaws about the same, means positioned at each side of said bed and adapted to project above the same, means for imparting a reciprocating motion to said last-mentioned means, said last-mentioned means being adapted to propel a blank along said bed beneath said movable member and upon said horn, a receptacle, a shaft journaled adjacent said receptacle, a circular member upon said shaft within said receptacle, supporting means, a cleansing wheel mounted adjacent said supporting means, means adapted to drive said cleansing wheel, means adapted to move said blank from said horn upon said supporting means, and means adapted to propel said blank along said supporting means and into engagement with said circular member and said cleansing wheel successively.

145. In combination, a bed, a movable member mounted adjacent said bed, a clutch, means whereby said clutch is thrown out upon the distance between said bed and said movable member exceeding a certain predetermined value, means adapted to clamp and hold a blank, rotary members adapted to strike and bend the oppositely projecting edges of said blank in opposite directions, a horn comprising a plurality of members, means adapted to expand said horn, a pair of jaws pivoted adjacent thereto, means adapted to close said jaws about said horn, means at each side of said bed and adapted to project above the same adapted upon being reciprocated to move a blank along said bed beneath said movable member, within the range of action of said clamping means and upon said horn successively, a receptacle, a shaft journaled adjacent said receptacle, a circular member upon said shaft within said receptacle, supporting means, a cleansing wheel mounted adjacent said supporting means, means adapted to drive said cleansing wheel, means adapted to move said blank from said horn upon said supporting means, and means adapted to propel said blank along said supporting means and into engagement with said circular member and said cleansing wheel successively.

146. In combination, a bed, magnetic means mounted adjacent said bed adapted to attract a member lying thereon, a movable member mounted adjacent said bed, a clutch, means whereby said clutch is thrown out upon the distance between said bed and said movable member exceeding a certain predetermined value, means adapted to clamp and hold a blank, rotary members adapted to strike and bend the oppositely projecting edges of said blank in opposite directions, a horn, a pair of jaws pivoted adjacent thereto, means adapted to close said jaws about said horn, means at each side of said bed and adapted to project above the same adapted upon being reciprocated to move a blank along said bed beneath said movable member within the range of action of said clamping means and upon said horn successively, a receptacle, a shaft journaled adjacent said receptacle, a circular member upon said shaft within said receptacle, supporting means, a cleansing wheel mounted adjacent said supporting means, means adapted to drive said cleansing wheel, means adapted to move said blank from said horn upon said supporting means, and means adapted to propel said blank along said supporting means and into engagement with said circular member and said cleansing wheel successively.

147. In combination, a bed, magnetic means mounted adjacent said bed adapted to attract a blank lying thereon, a movable member mounted adjacent said bed, a clutch, means whereby said clutch is thrown out upon the distance between said bed and said movable member exceeding a certain predetermined value, a horn comprising a plurality of parts, means adapted to expand said horn, a pair of jaws pivoted adjacent thereto, means adapted to close said jaws about the same, means positioned at each side of said bed and adapted to project above the same, means for imparting a reciprocating motion to said last-mentioned means, said last-mentioned means being adapted to propel a blank along said bed beneath said movable member and upon said horn, a receptacle, a shaft journaled adjacent said receptacle, a circular member upon said shaft within said receptacle, supporting means, a cleansing wheel mounted adjacent said supporting means, means adapted to drive said cleansing wheel, means adapted to move said blank from said horn upon said supporting means, and means adapted to propel said blank along said supporting means and into engagement with said circular member and said cleansing wheel successively.

148. In a machine of the class described, in combination, a solder bath, a supporting member at each end of said bath, stretched flexible wires extending between said supporting members adapted to guide cans adjacent said bath, and means adapted to propel said cans along said wires and in operative relation to said bath.

149. In a machine of the class described, in combination, a solder bath, a supporting member at each end of said bath and independent thereof, spring pressed wires stretched between said supporting members adapted to guide cans adjacent said bath, and means adapted to propel said cans along said wires and in operative relation to said bath.

150. In a machine of the class described, in combination, a solder bath, a supporting member at each end thereof and independent of said bath, a plurality of wires secured at one end upon one of said supporting members and having their remaining ends mounted upon the other of said supporting members, said wires being adapted to guide cans adjacent said bath, nuts upon the second mentioned ends of said wires, springs interposed between said nuts and the adjacent supporting member, and means adapted to propel said cans along said wires in operative relation to said bath.

151. In a machine of the class described, in combination, a bed, a pair of supports mounted upon said bed, a solder bath mounted upon said bed between said supports, and means mounted upon said supports and adapted to guide a can into operative relation to said bath.

152. In a machine of the class described, in combination, a pair of supports, and a plurality of flexible members mounted upon said supports and placed under tension and adapted to guide a can.

153. A can guide comprising a plurality of flexible members, and means adapted to place the same under tension.

154. In a machine of the class described, in combination, a pair of supports, a solder bath between said supports, and guiding means adapted to guide a can in operative relation to said bath, said guiding means comprising a plurality of flexible members and springs adapted to place the same under tension.

In testimony whereof I affix my signature, in the presence of two witnesses.

CHARLES W. GRAHAM.

Witnesses:
W. O. FORD,
E. H. CARTER.